United States Patent
Lindblad et al.

(10) Patent No.: US 8,262,047 B2
(45) Date of Patent: Sep. 11, 2012

(54) STAND WITH PANNING BASE

(75) Inventors: Shaun C. Lindblad, Lino Lakes, MN (US); John Cain, Eagan, MN (US)

(73) Assignee: Ergotron, Inc., St. Paul, MN (US)

( * ) Notice: Subject to any disclaimer, the term of this patent is extended or adjusted under 35 U.S.C. 154(b) by 0 days.

(21) Appl. No.: 12/958,871

(22) Filed: Dec. 2, 2010

(65) Prior Publication Data

US 2011/0075350 A1    Mar. 31, 2011

Related U.S. Application Data

(60) Continuation of application No. 12/407,566, filed on Mar. 19, 2009, now Pat. No. 7,887,014, which is a division of application No. 11/800,115, filed on May 4, 2007, now abandoned.

(60) Provisional application No. 60/797,562, filed on May 4, 2006.

(51) Int. Cl.
*A47G 29/00* (2006.01)

(52) U.S. Cl. ............... 248/372.1; 248/162.1; 248/176.3; 248/188.2

(58) Field of Classification Search .......... 248/371, 248/372.1, 162.1, 411, 157, 419, 420, 421, 248/176.3, 188.2, 346.06; 211/26
See application file for complete search history.

(56) References Cited

U.S. PATENT DOCUMENTS

| | | | |
|---|---|---|---|
| 2,168,209 A | | 8/1939 | Haupt |
| 2,311,928 A | * | 2/1943 | Buehler ................. 280/47.33 |
| 3,575,368 A | | 4/1971 | Thomas |
| 4,047,759 A | * | 9/1977 | Koscinski ............... 297/344.14 |
| 4,615,502 A | | 10/1986 | McLaughlin |
| 4,934,647 A | | 6/1990 | Edwards |
| 5,088,676 A | | 2/1992 | Orchard |
| 5,738,316 A | | 4/1998 | Sweere |
| 5,765,797 A | * | 6/1998 | Greene et al. .............. 248/398 |
| 5,833,183 A | * | 11/1998 | Chang ..................... 248/176.1 |
| 5,868,079 A | | 2/1999 | Charny |
| 5,918,841 A | | 7/1999 | Sweere |
| 5,947,429 A | | 9/1999 | Sweere |

(Continued)

FOREIGN PATENT DOCUMENTS

EP    1337782    4/2007

OTHER PUBLICATIONS

Seven (7) sheets of photos of laptop holders. Shown before Oct. 21, 2004.

(Continued)

*Primary Examiner* — Bradley Duckworth
(74) *Attorney, Agent, or Firm* — Fredrickson & Byron, P.A.

(57) ABSTRACT

A stand for supporting an object. The stand includes a base, a support member coupled to the base, and a movement mechanism adapted to allow the object to move along a range of travel relative to the base. The base includes a planar surface for resting on a support surface. The planar surface includes a first portion and a second portion. The first portion includes a pad for providing frictional resistance between the base and the support surface on which the base is placed. The second portion includes at least first and second wheels, for rotating the base about the pad such that the object is rotated about the pad when the base is rotated about the pad.

19 Claims, 38 Drawing Sheets

U.S. PATENT DOCUMENTS

| | | | |
|---|---|---|---|
| 5,957,426 A * | 9/1999 | Brodersen | 248/588 |
| 6,038,986 A * | 3/2000 | Ransil et al. | 108/145 |
| 6,189,849 B1 | 2/2001 | Sweere | |
| 6,213,438 B1 | 4/2001 | Ostby | |
| 6,394,402 B2 | 5/2002 | Coonan | |
| 6,695,274 B1 * | 2/2004 | Chiu | 248/371 |
| 6,712,008 B1 | 3/2004 | Habenicht | |
| 6,994,306 B1 | 2/2006 | Sweere | |
| 6,997,422 B2 | 2/2006 | Sweere | |
| 7,032,870 B2 | 4/2006 | Sweere | |
| 7,035,100 B2 * | 4/2006 | Lord | 361/679.41 |
| 7,061,753 B2 * | 6/2006 | Michoux et al. | 361/679.05 |
| 7,252,277 B2 | 8/2007 | Sweere | |
| 2004/0007651 A1 * | 1/2004 | Williams et al. | 248/346.06 |
| 2004/0026590 A1 * | 2/2004 | Lin | 248/346.04 |
| 2004/0245419 A1 * | 12/2004 | Sweere et al. | 248/276.1 |
| 2004/0250635 A1 | 12/2004 | Sweere | |
| 2005/0034547 A1 | 2/2005 | Sweere | |
| 2005/0145762 A1 | 7/2005 | Sweere | |
| 2005/0236536 A1 | 10/2005 | Fan | |
| 2005/0284990 A1 * | 12/2005 | Souza et al. | 248/122.1 |
| 2006/0185563 A1 | 8/2006 | Sweere | |
| 2006/0278795 A1 * | 12/2006 | Lee | 248/371 |
| 2007/0029457 A1 * | 2/2007 | Baek | 248/372.1 |

OTHER PUBLICATIONS

International Search Report and Written Opinion for International Application No. PCT/US07/10898, dated Jan. 21, 2008, 11 pages.
International Preliminary Report on Patentability for International Application No. PCT/US07/10898, dated Nov. 13, 2008, 8 pages.

* cited by examiner

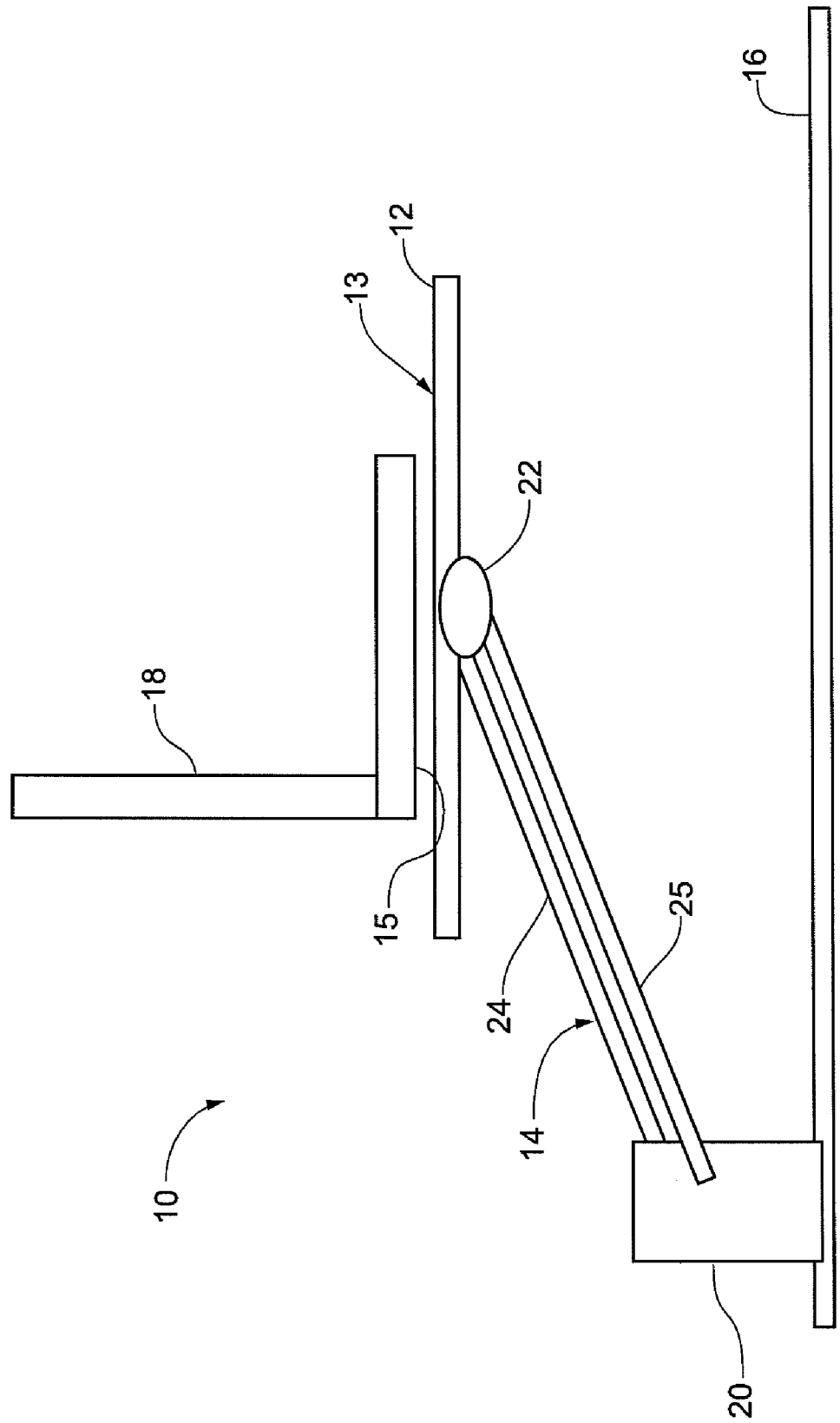

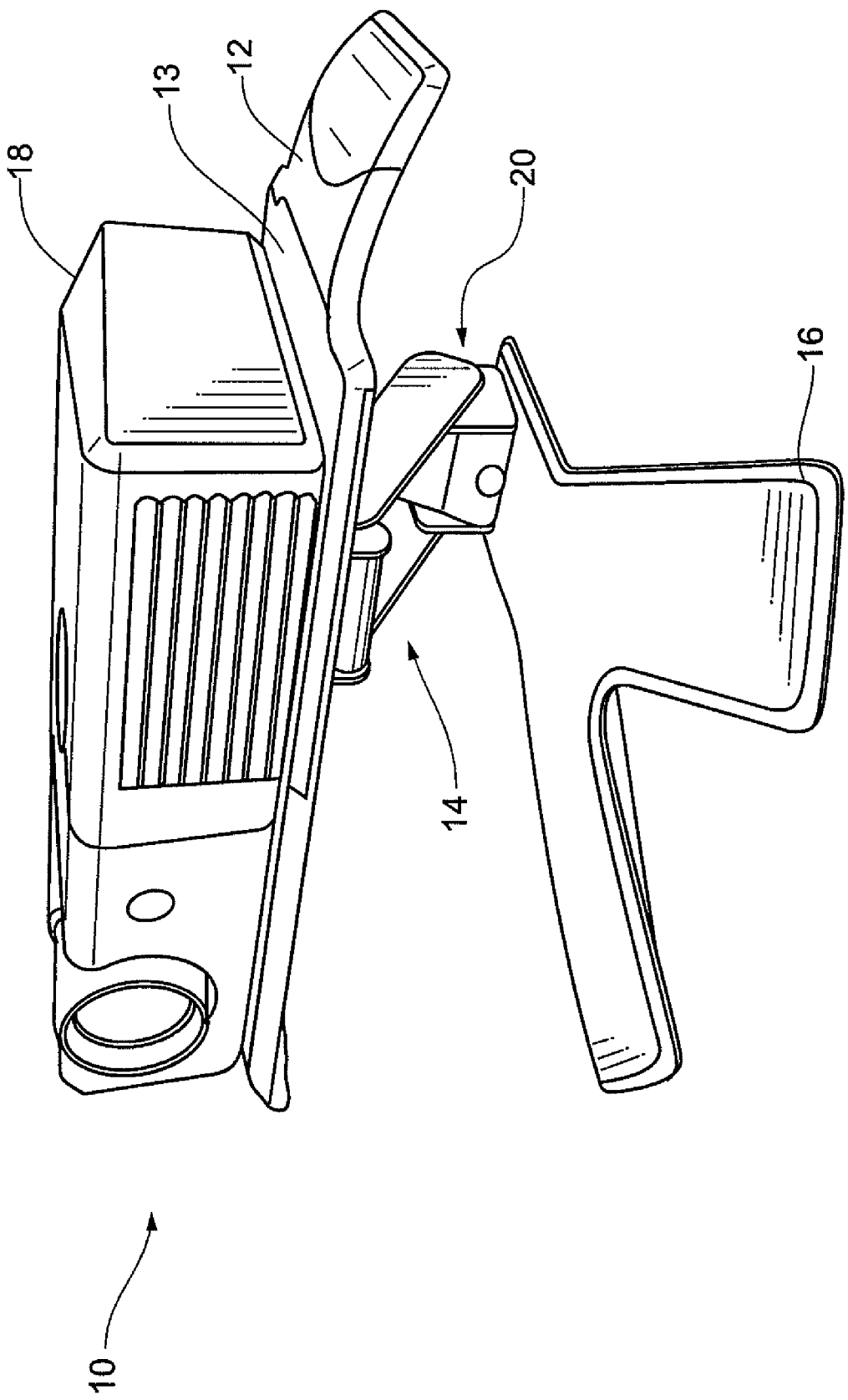

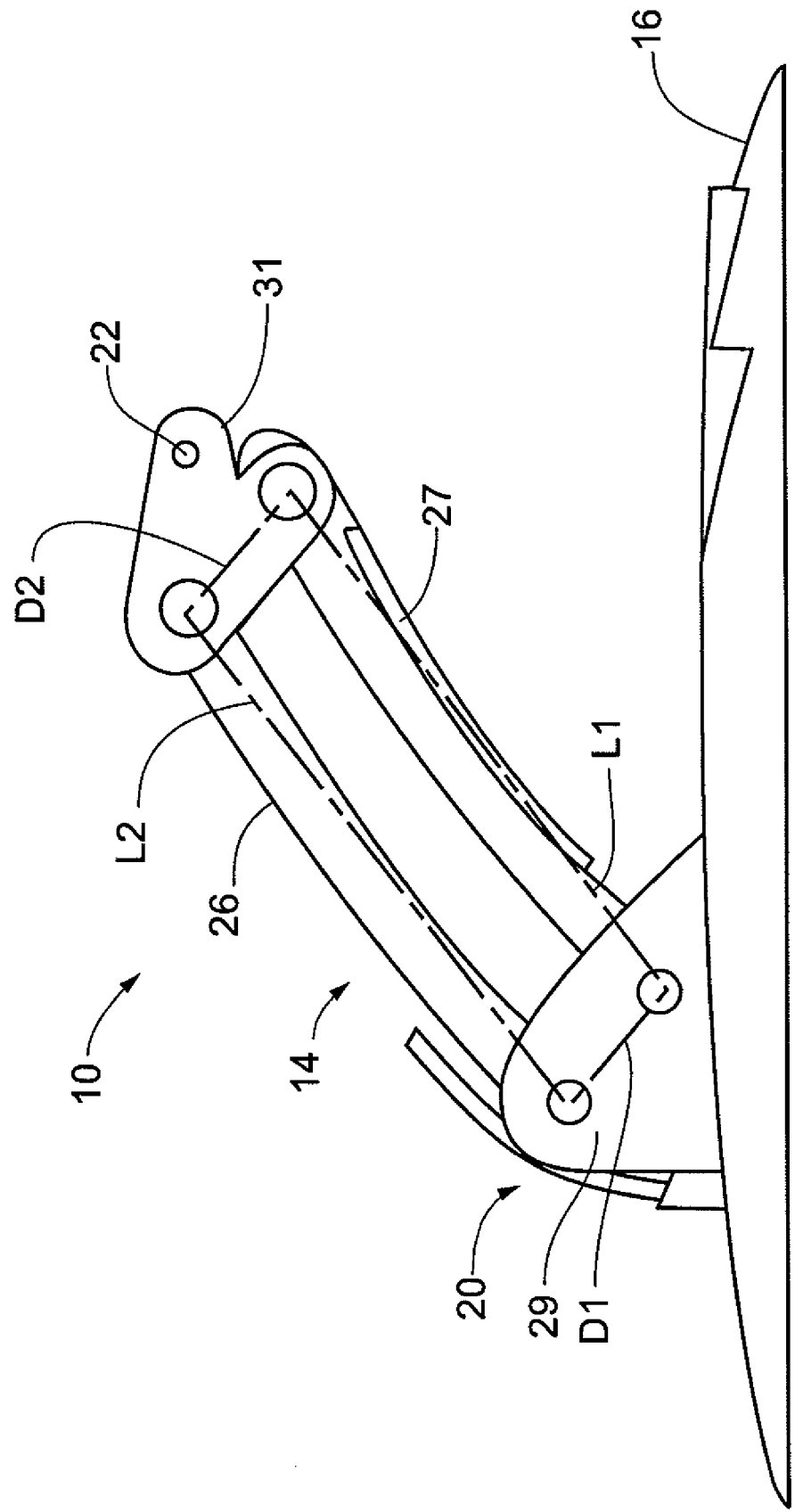

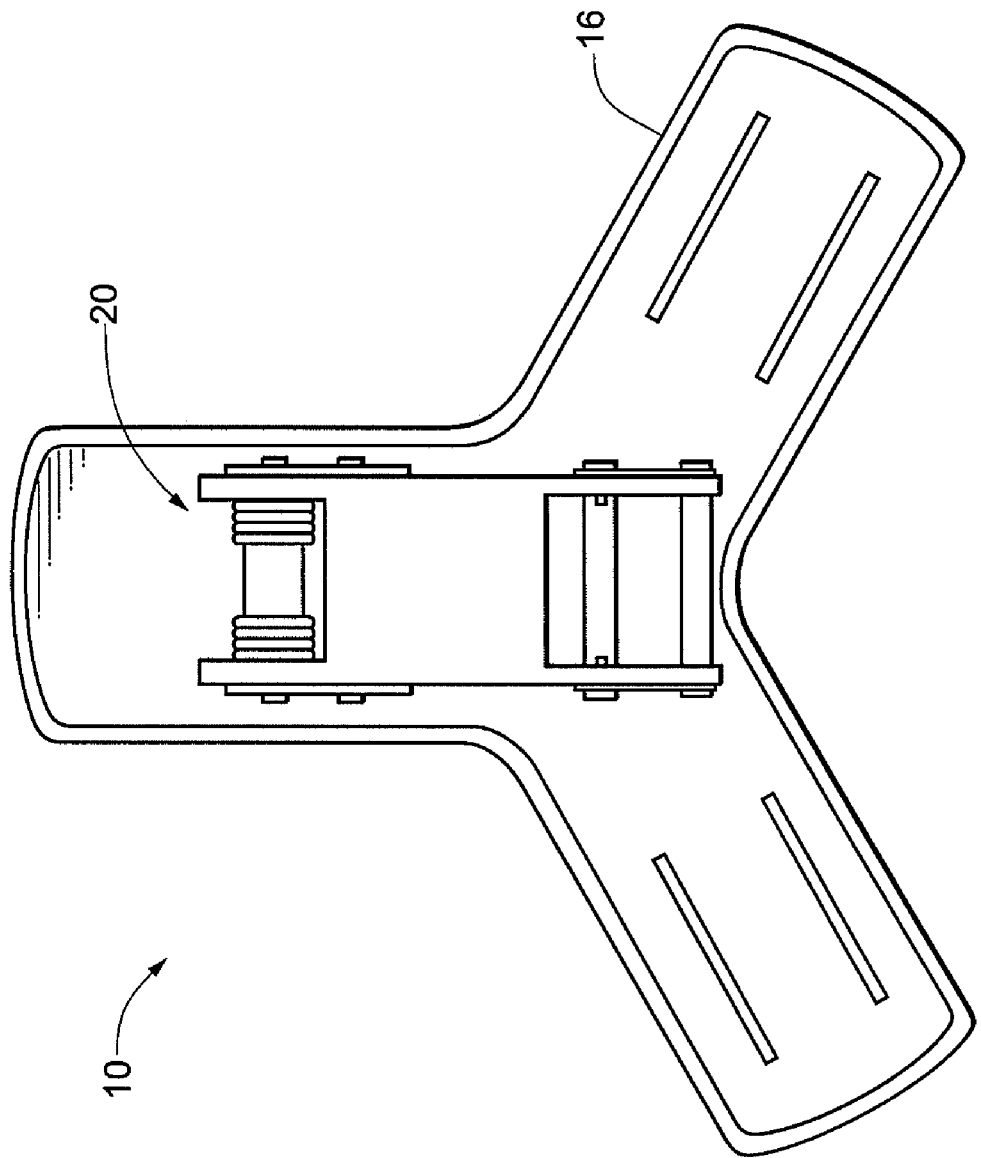

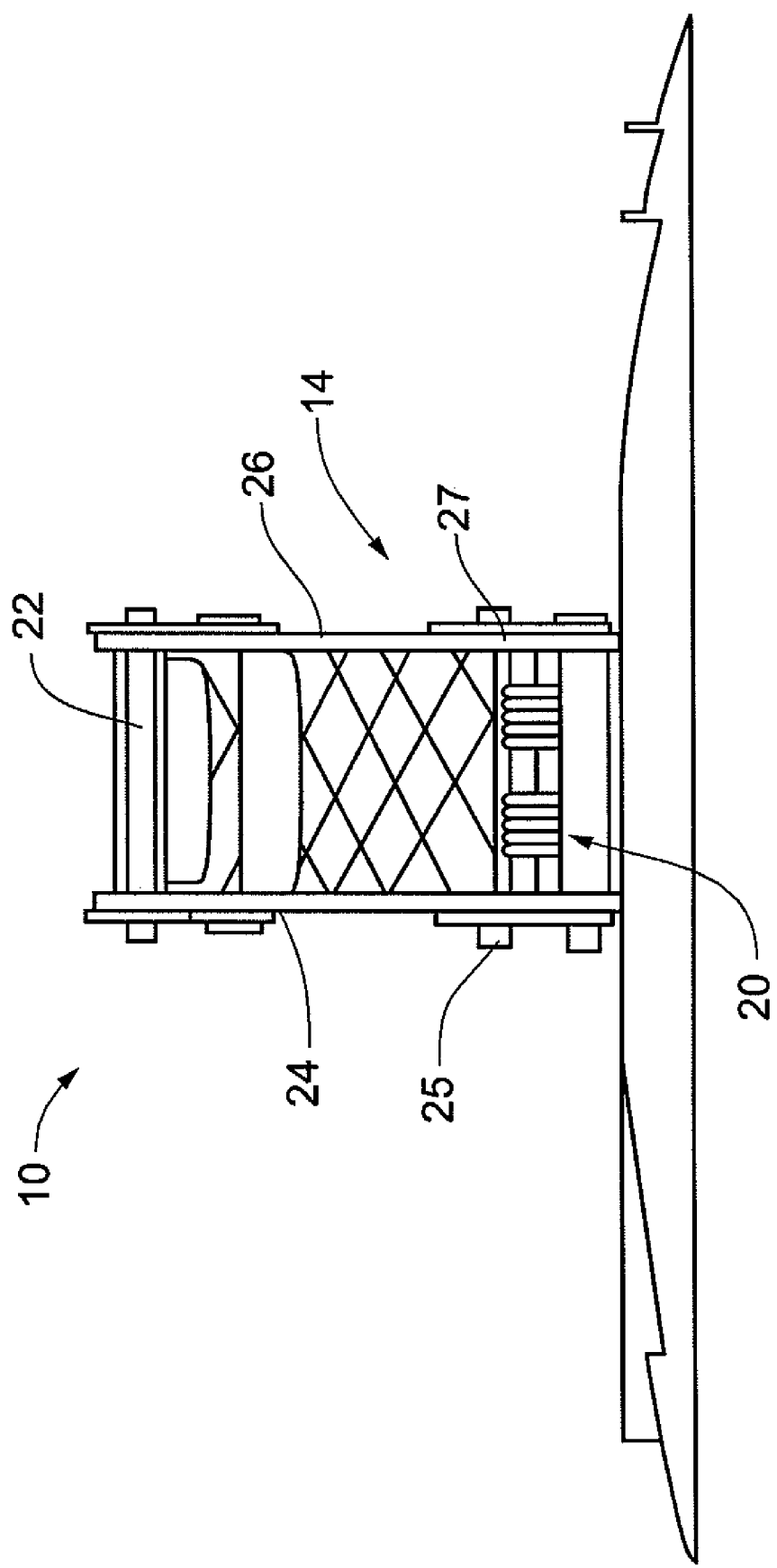

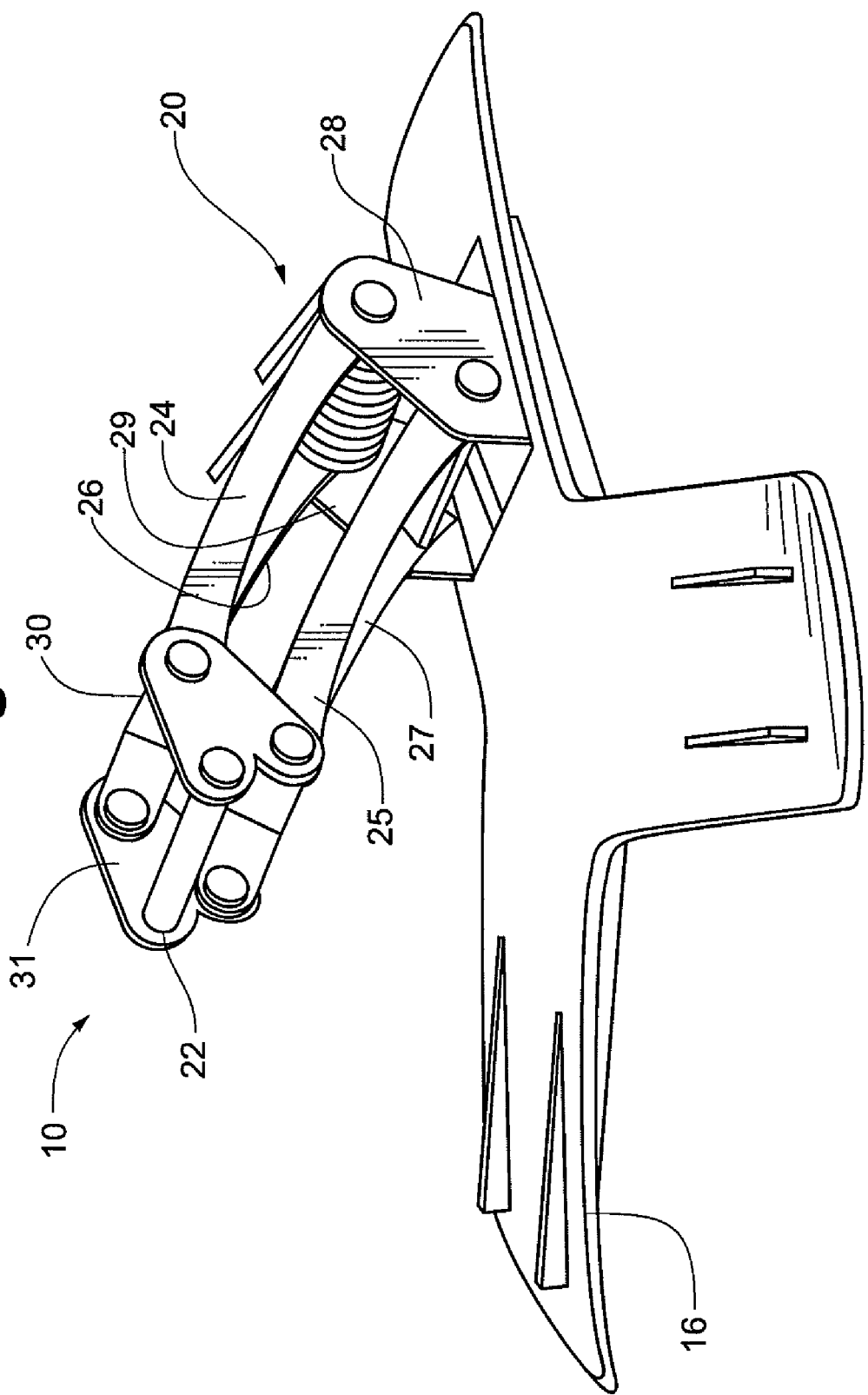

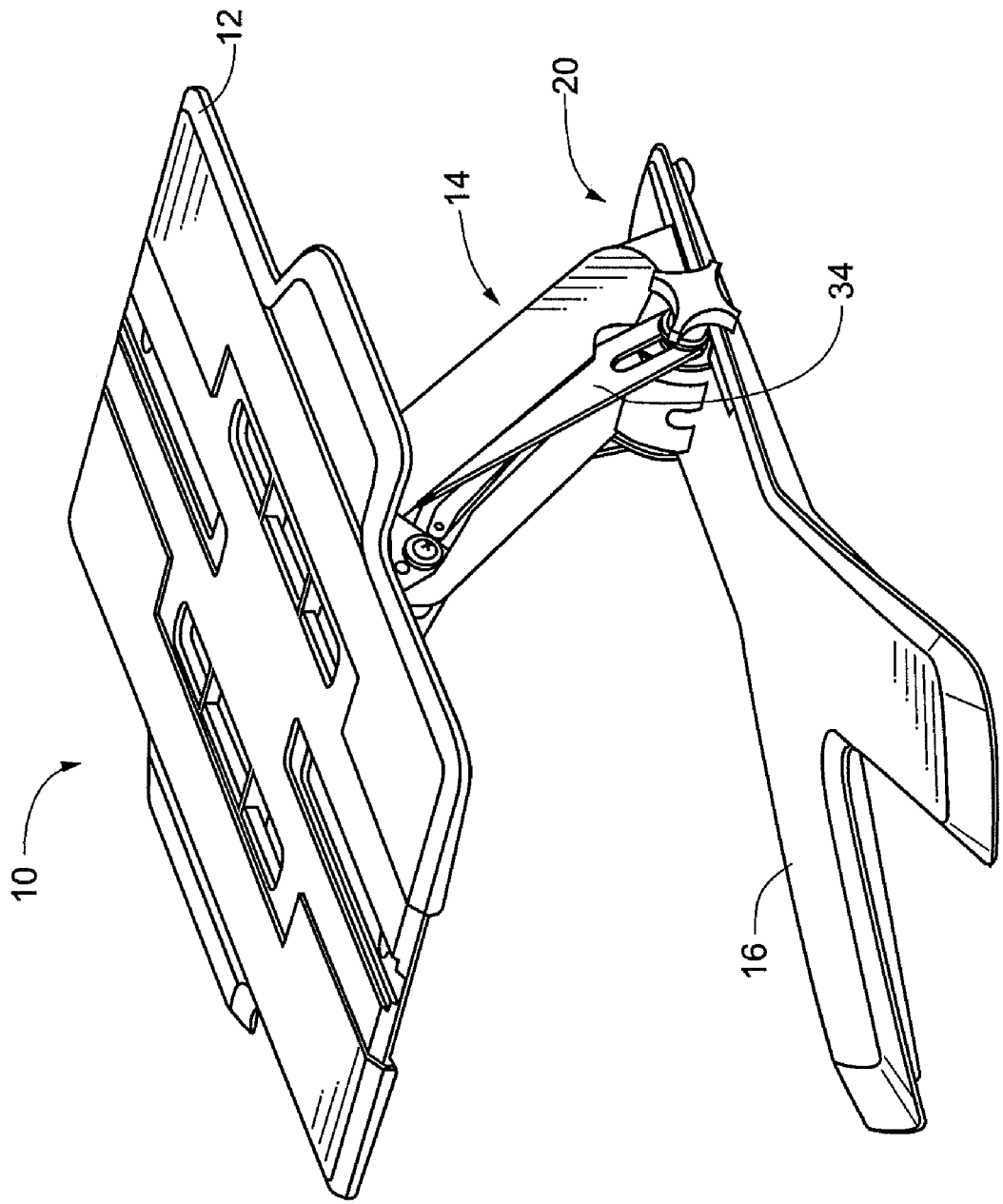

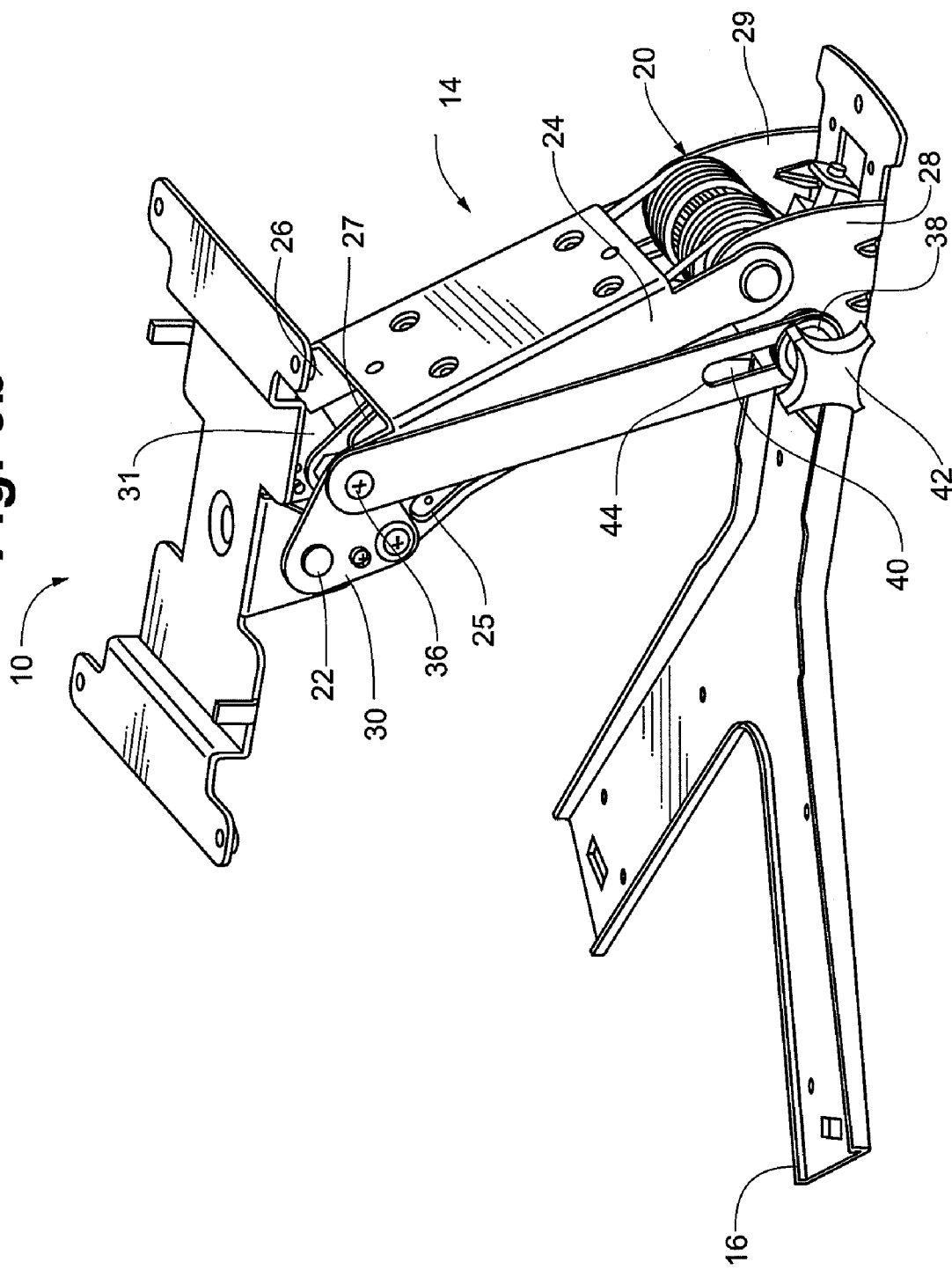

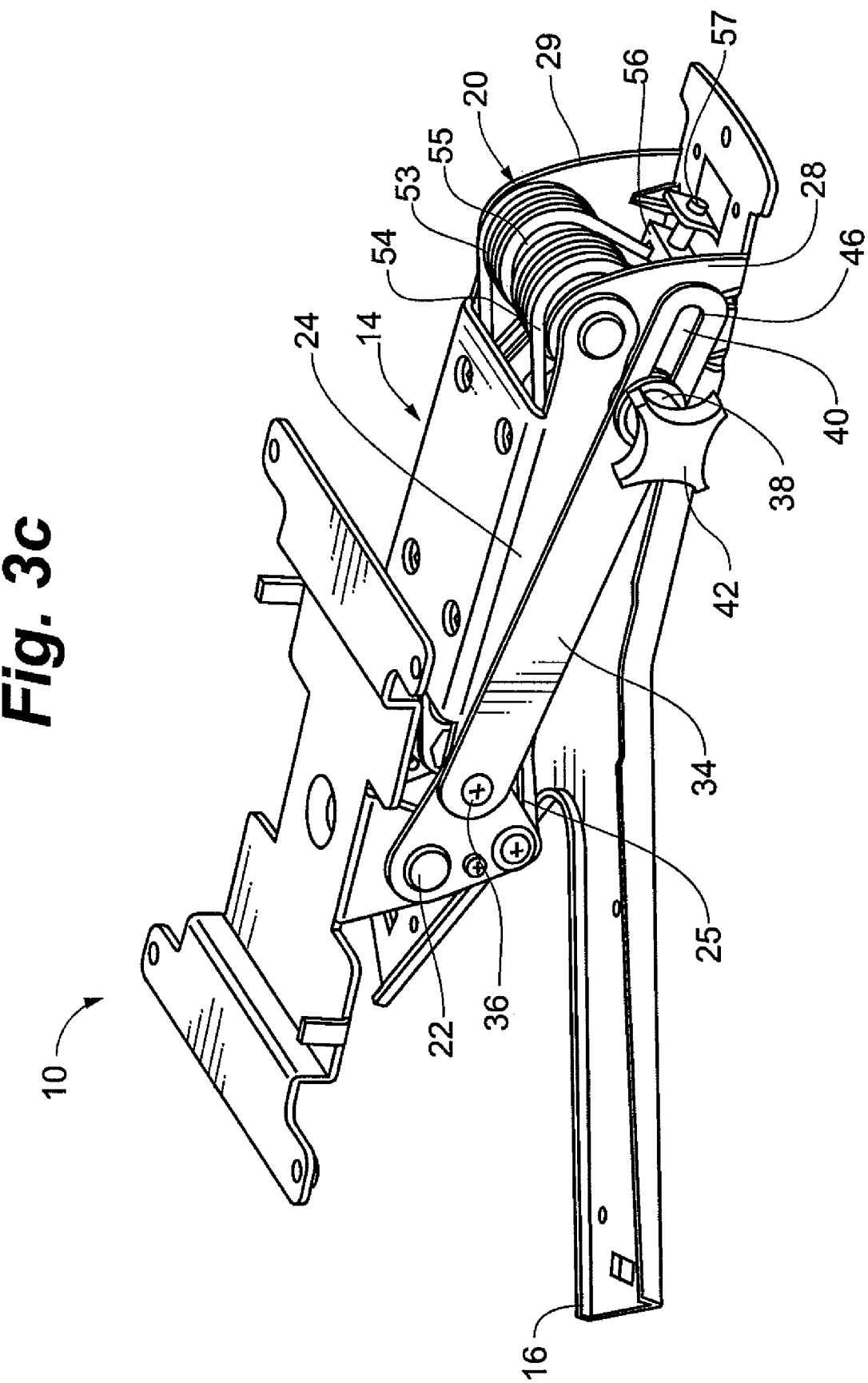

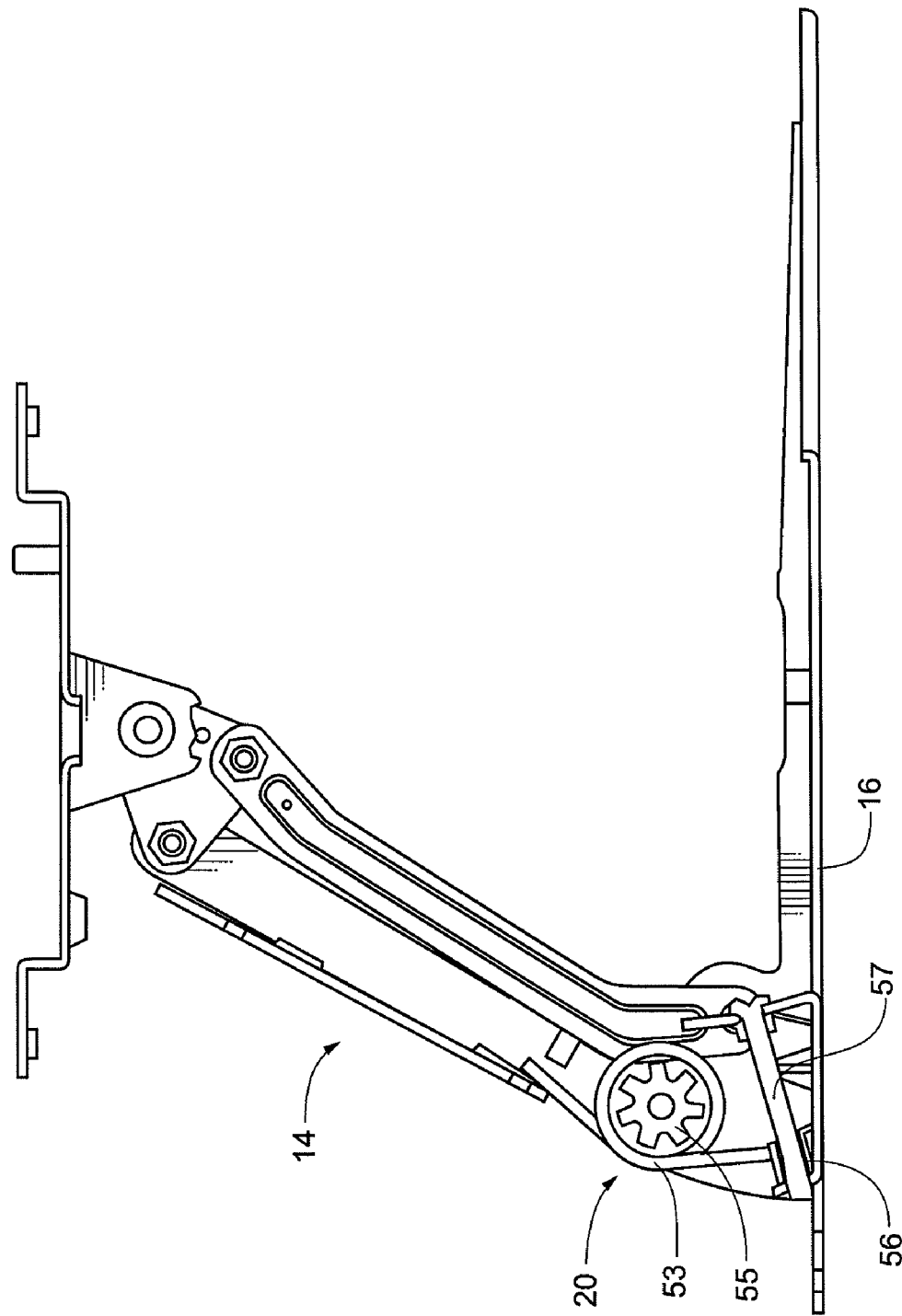

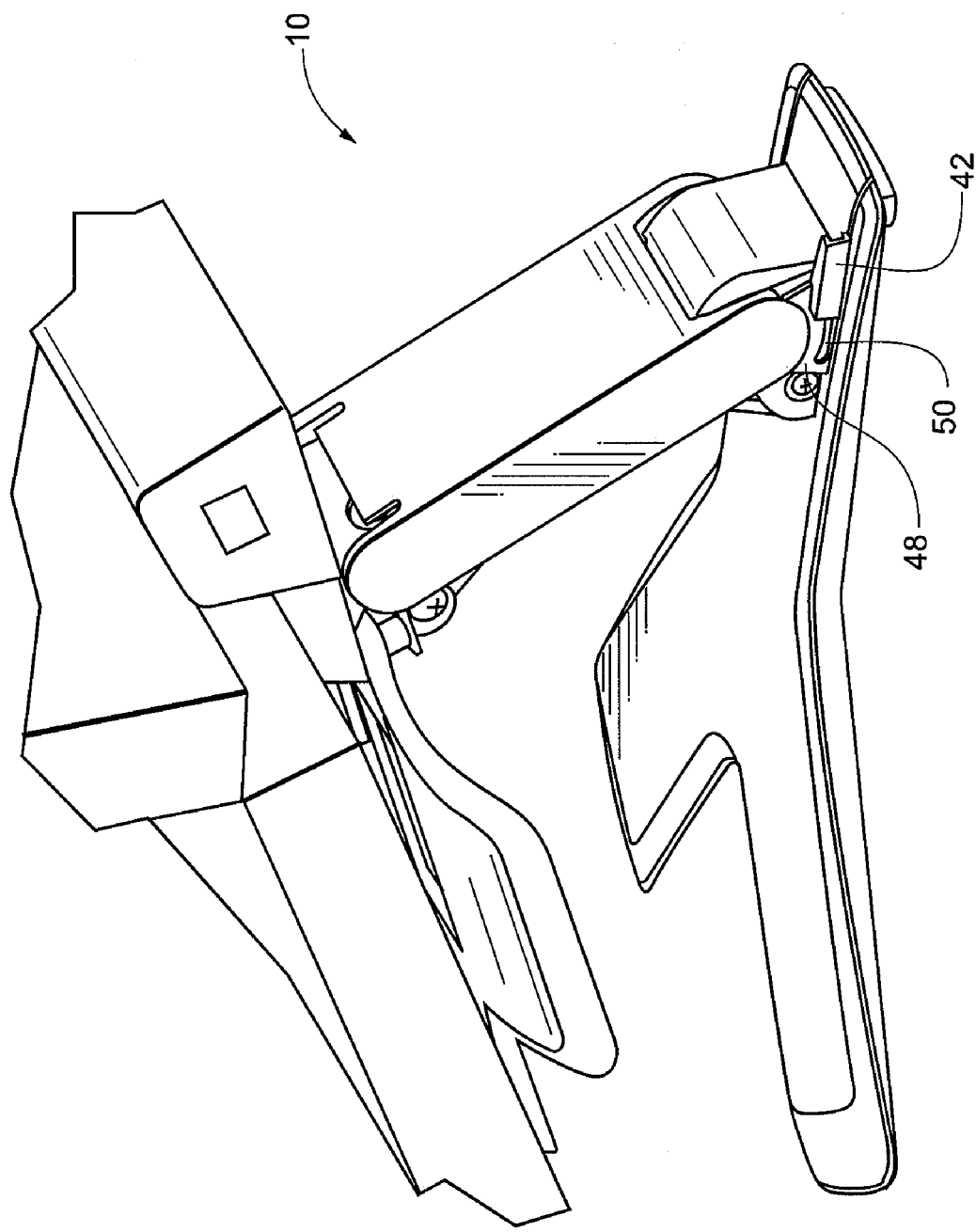

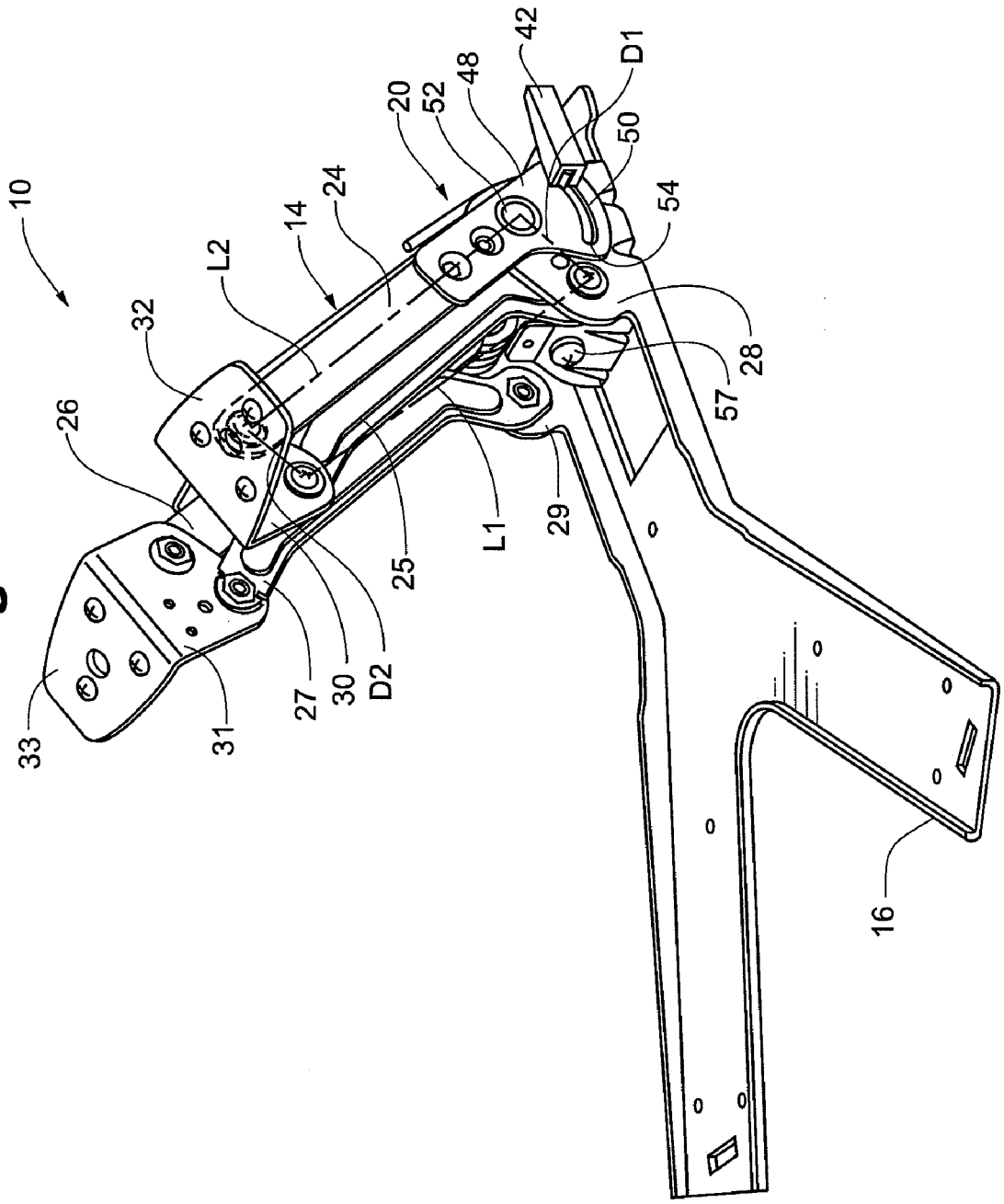

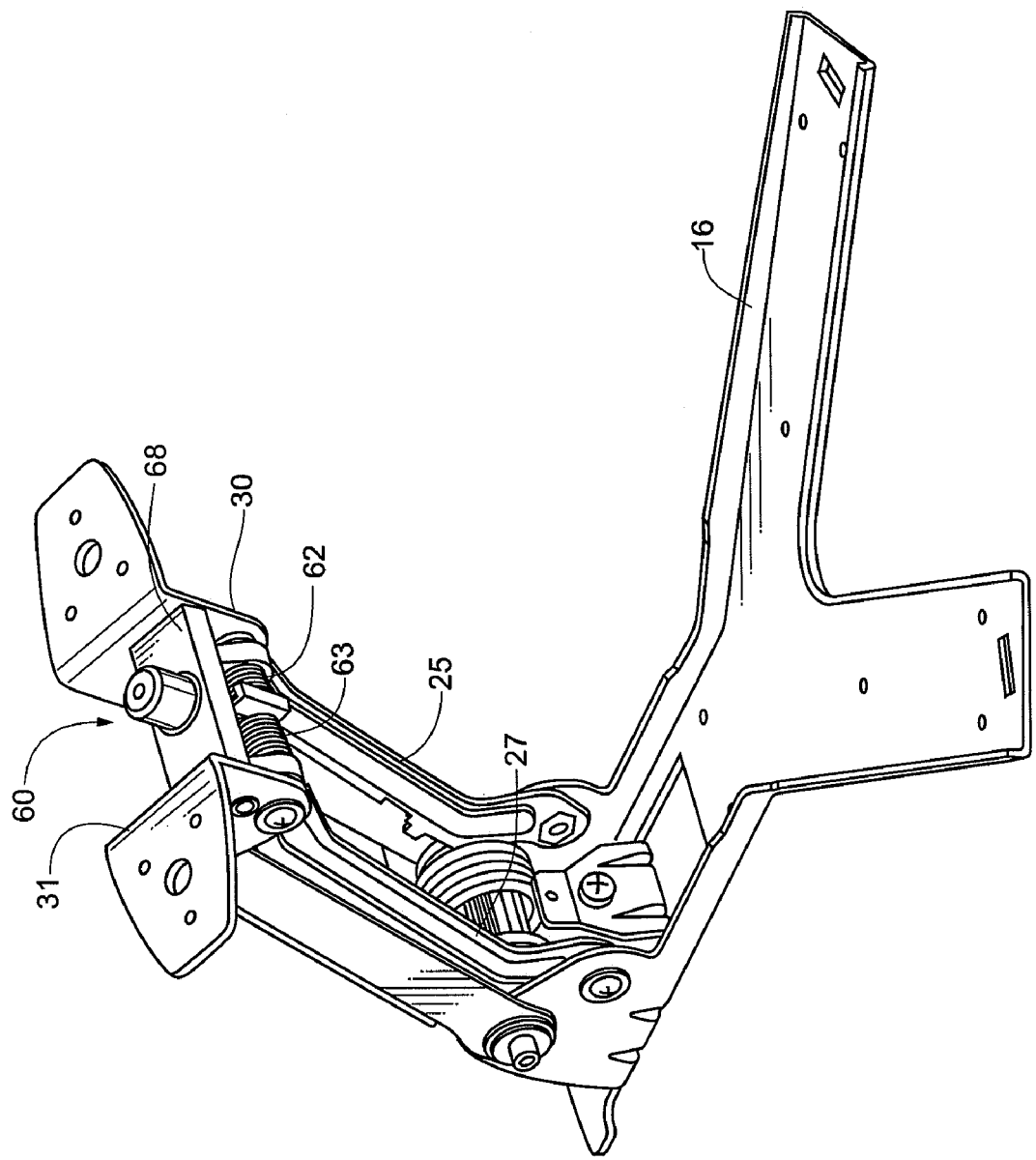

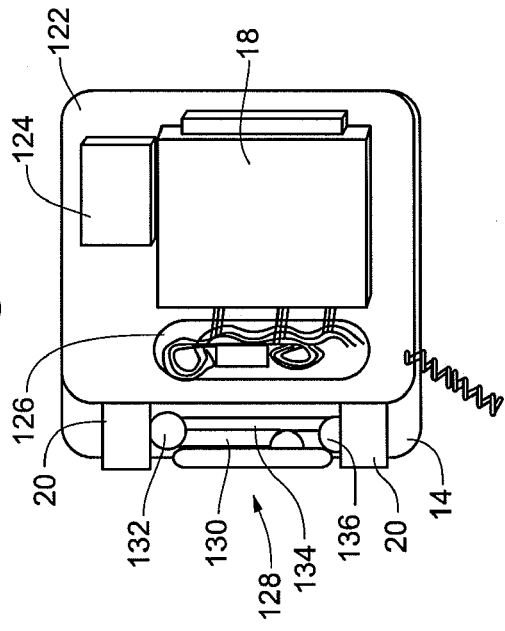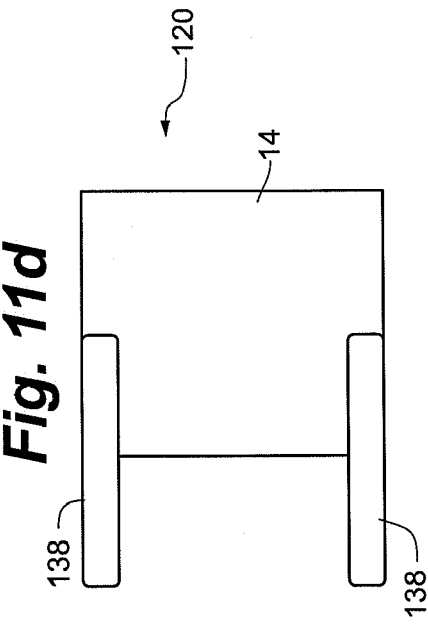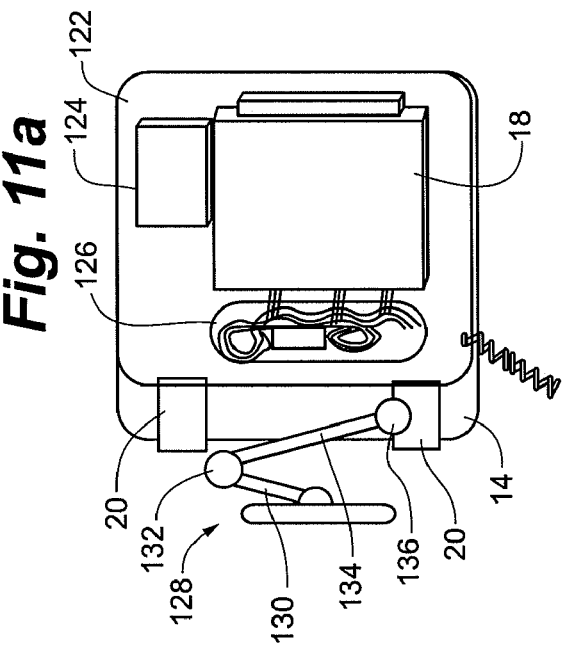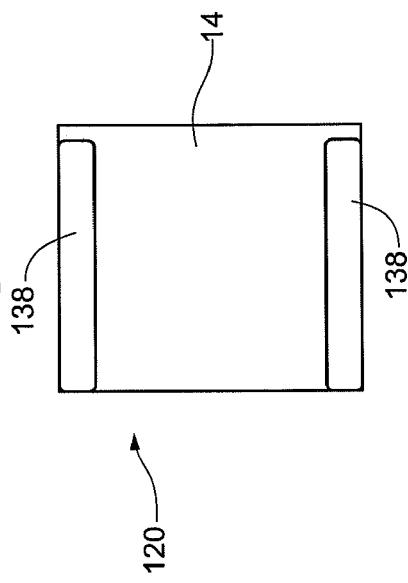

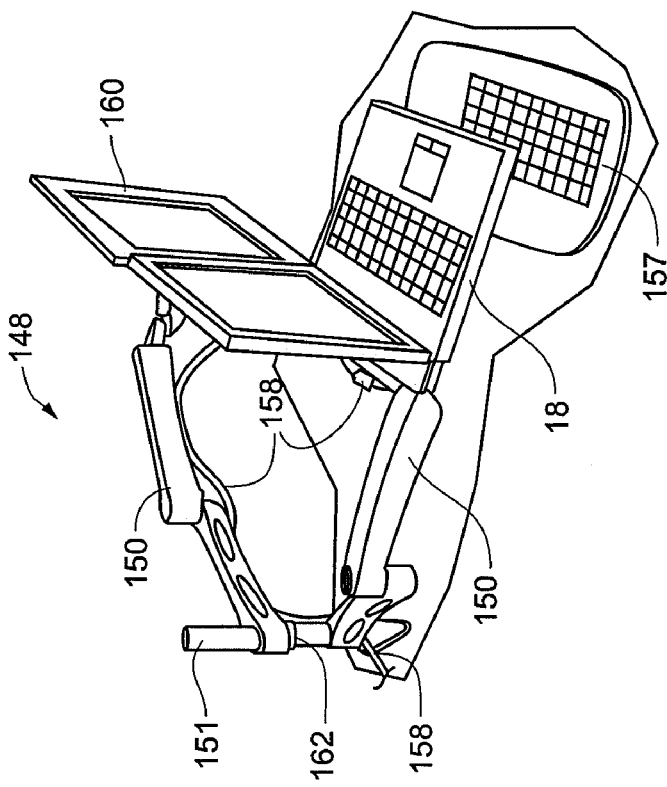
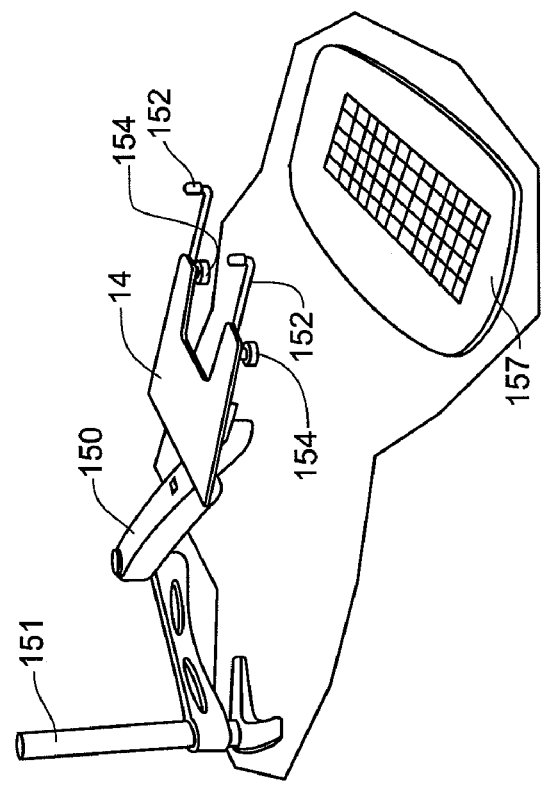

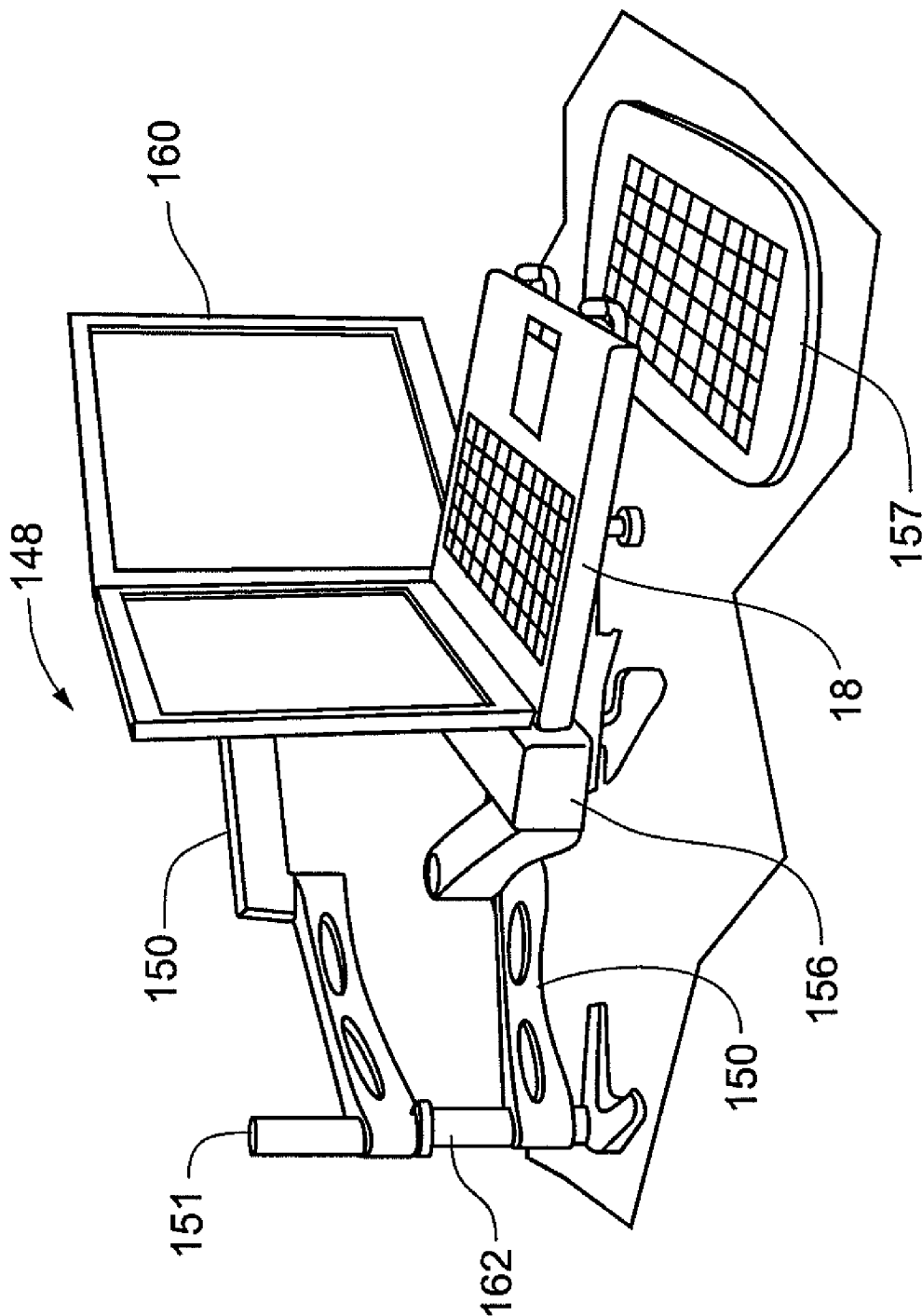

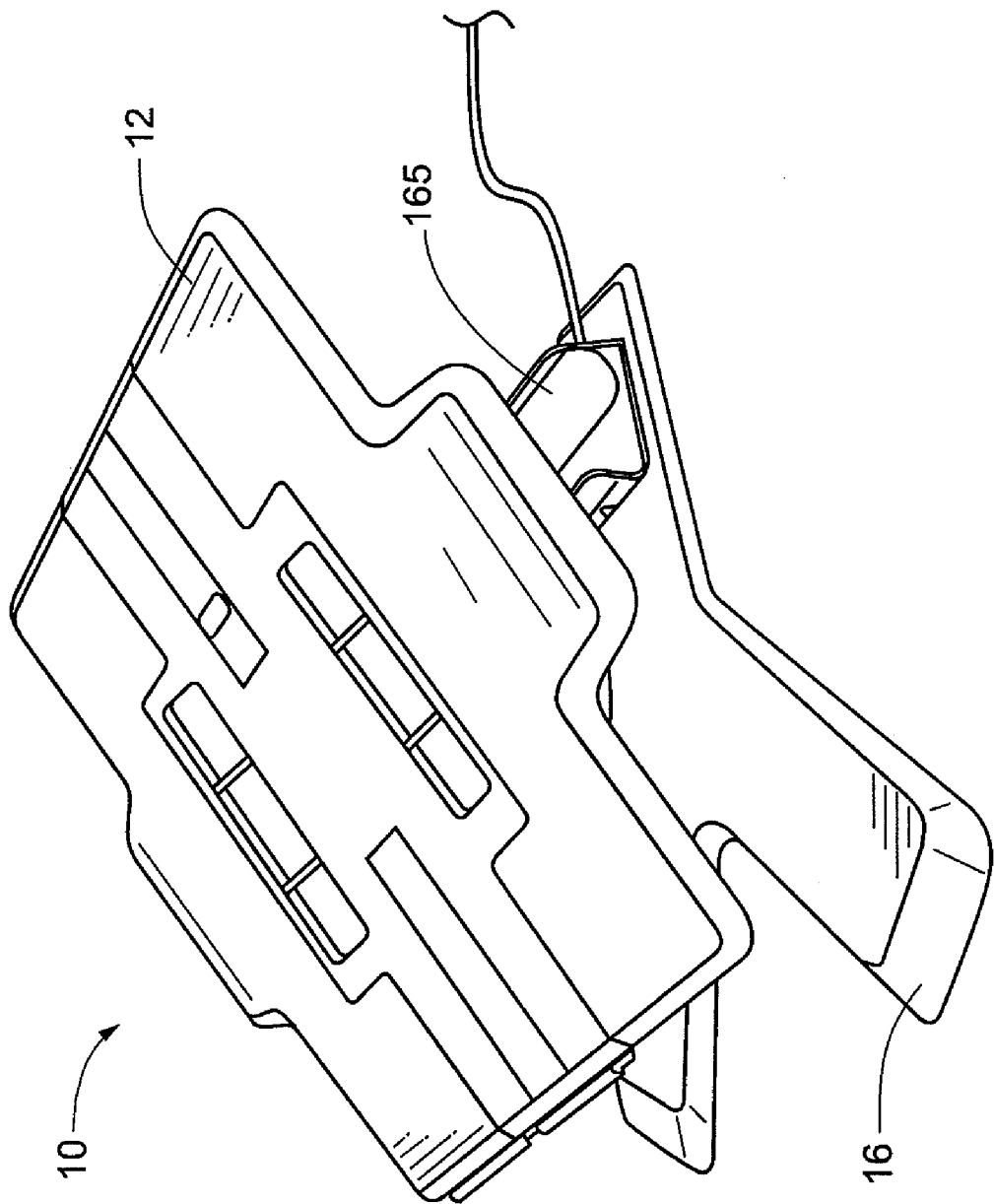

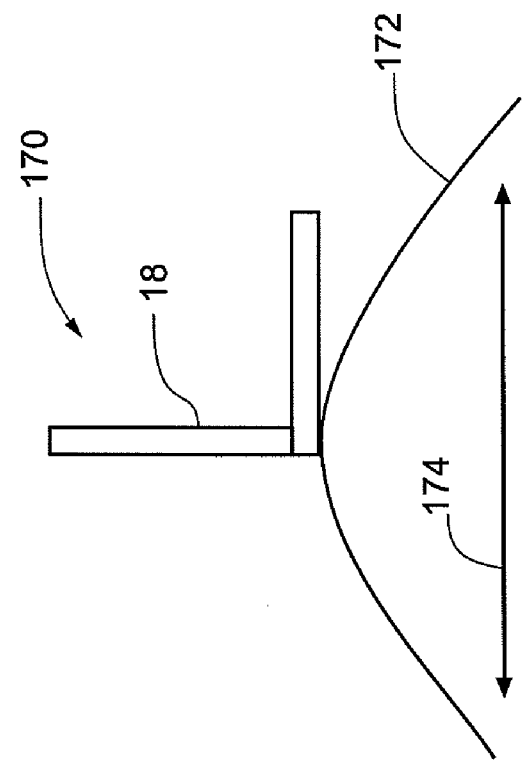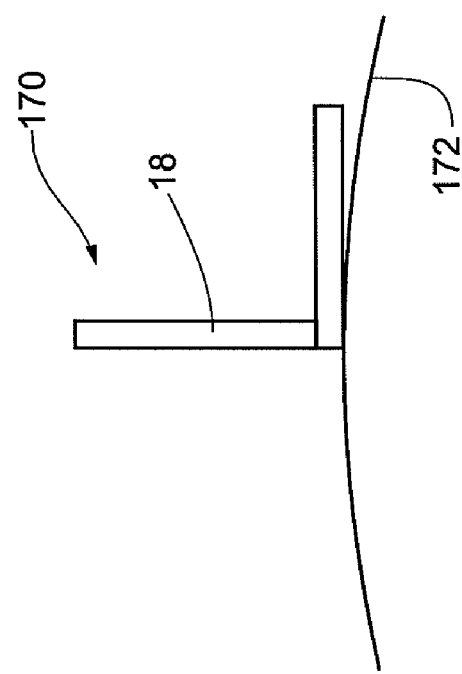

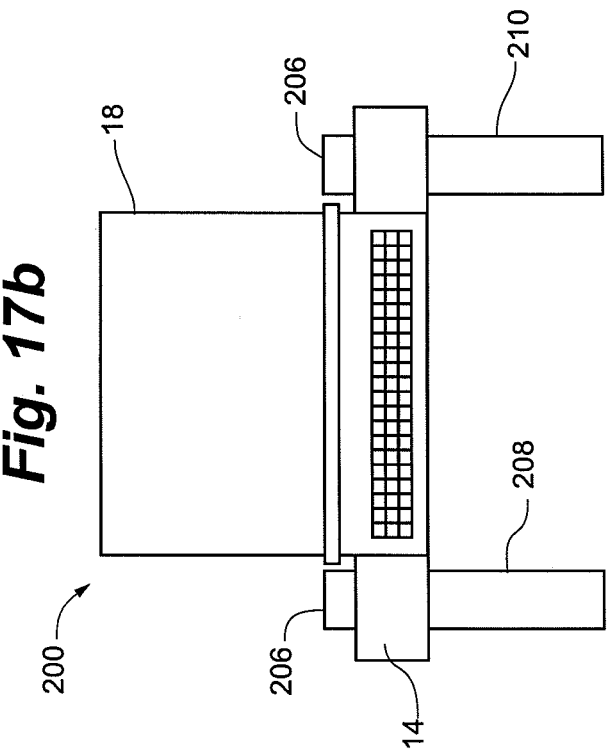
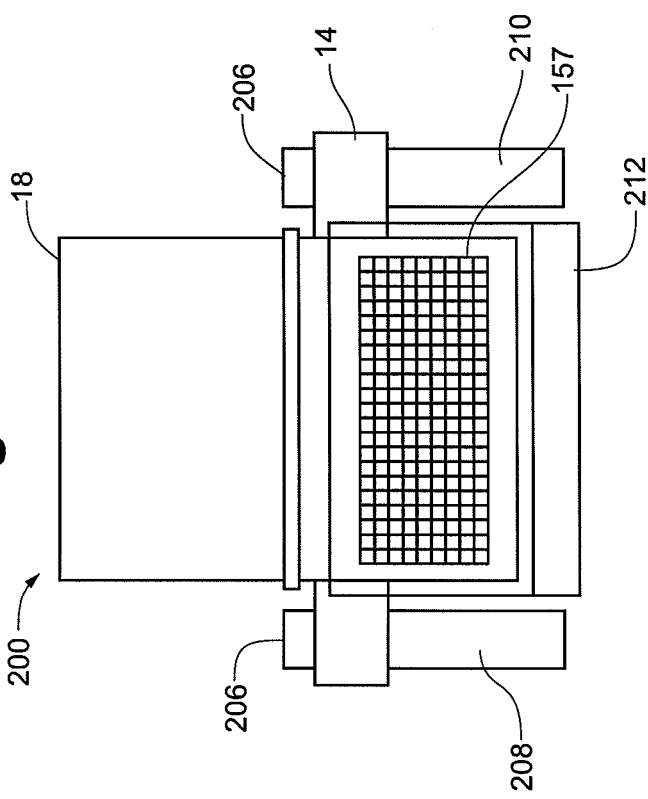

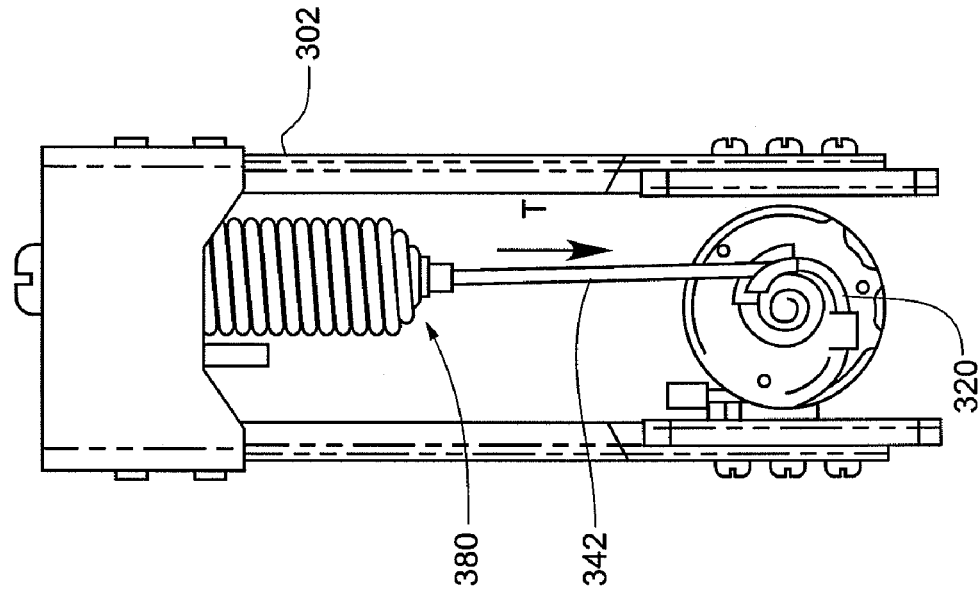
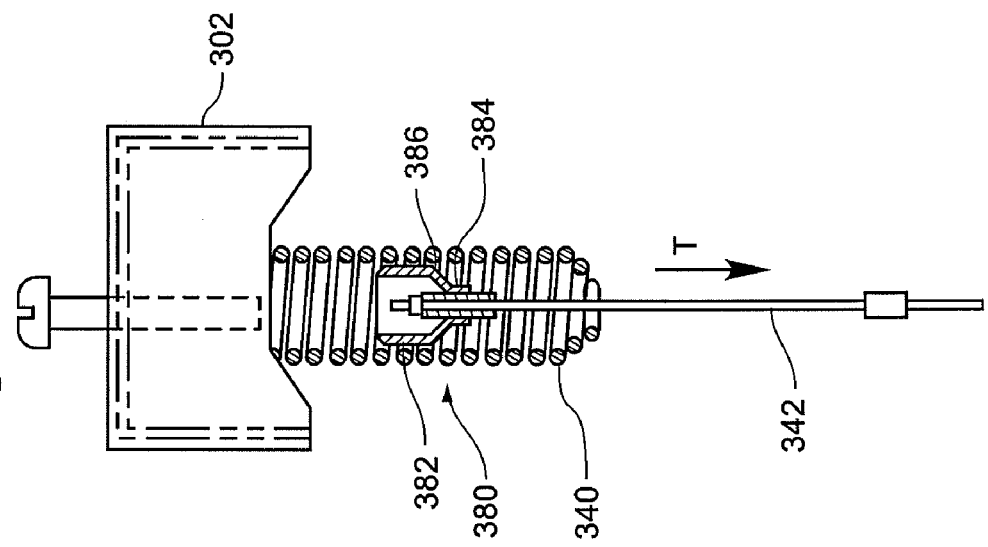
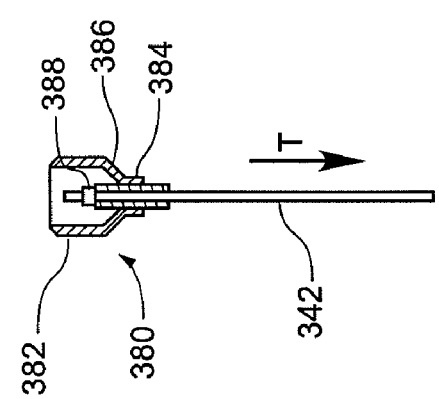

STAND WITH PANNING BASE

RELATED APPLICATIONS

This application is a continuation of U.S. application Ser. No. 12/407,566, titled STAND SYSTEM AND METHOD, filed Mar. 19, 2009, which is a divisional of U.S. patent application Ser. No. 11/800,115, titled STAND SYSTEM AND METHOD, filed May 4, 2007, which claims priority to U.S. Provisional Application Ser. No. 60/797,562, filed May 4, 2006, and titled NOTEBOOK STAND SYSTEM AND METHOD, the contents of all of which are hereby incorporated by reference.

FIELD

The following disclosure describes embodiments of the invention that generally relate to stands, and more particularly relate to adjustable stands.

SUMMARY

Embodiments of the invention include a stand for supporting an object. The stand can include a base, a support member coupled to the base, and a movement mechanism adapted to allow the object to move along a range of travel relative to the base. The base can include a planar surface for resting on a support surface. The planar surface can include a first portion and a second portion. The first portion can include a pad for providing frictional resistance between the base and the support surface on which the base is placed. The second portion can include at least first and second wheels, for rotating the base about the pad such that the object is rotated about the pad when the base is rotated about the pad.

BRIEF DESCRIPTION OF THE DRAWINGS

FIG. 1(a) shows a schematic representation of a stand supporting a notebook in accordance with an embodiment of the invention.

FIG. 1(b) shows a front perspective view of a stand supporting a projector in accordance with an embodiment of the invention.

FIG. 2(a) shows a side elevation view of a stand including a bar linkage in accordance with an embodiment of the invention.

FIG. 2(b) shows a top plan view of the stand of FIG. 2(a).

FIG. 2(c) shows a front elevation view of the stand of FIG. 2(a).

FIG. 2(d) shows a front perspective view of the stand of FIG. 2(a).

FIG. 3(a) shows a front perspective view of a stand including a locking mechanism with a slider bar in accordance with an embodiment of the invention.

FIG. 3(b) shows a side perspective view of a stand including a locking mechanism with a slider bar in a first position in accordance with an embodiment of the invention.

FIG. 3(c) shows a side perspective view of a stand including a locking mechanism with a slider bar in a second position in accordance with an embodiment of the invention.

FIG. 3(d) shows a side elevation partial cross-sectional view of a stand in a first position in accordance with an embodiment of the invention.

FIG. 4(a) shows a rear perspective view of a stand including a locking mechanism with a rotating bracket in accordance with an embodiment of the invention.

FIG. 4(b) shows a front perspective view of a stand including a locking mechanism with a rotating bracket in a first position in accordance with an embodiment of the invention.

FIG. 5(c) shows a front perspective view of a stand including a locking mechanism with a plunger assembly in accordance with an embodiment of the invention.

FIG. 11(a) shows a top plan view of a stand including a sliding tray in a first position in accordance with an embodiment of the invention.

FIG. 11(b) shows a top plan view of a stand including a sliding tray in a second position in accordance with an embodiment of the invention.

FIG. 11(c) shows a top plan view of a stand including a sliding tray in a first position in accordance with an embodiment of the invention.

FIG. 11(d) shows a top plan view of a stand including a sliding tray in a second position in accordance with an embodiment of the invention.

FIG. 13(a) shows a side perspective view of a stand including an arm in accordance with an embodiment of the invention.

FIG. 13(b) shows a side perspective view of a stand including an arm in accordance with an embodiment of the invention.

FIG. 13(c) shows a side perspective view of a stand including an arm in accordance with an embodiment of the invention.

FIG. 13(d) shows a perspective view of a stand including an inductive charger in accordance with an embodiment of the invention.

FIG. 14(a) shows a schematic representation of a stand including a deformable base in a first position in accordance with an embodiment of the invention.

FIG. 14(b) shows a schematic representation of a stand including a deformable base in a second position in accordance with an embodiment of the invention.

FIG. 17(a) shows a front elevation view of a stand including a height adjustable wall mount in a first position in accordance with an embodiment of the invention.

FIG. 17(b) shows a front elevation view of a stand including a height adjustable wall mount in a second position in accordance with an embodiment of the invention.

FIG. 21(a) shows a side elevation partial cross-sectional view of a bullet mechanism in accordance with an embodiment of the present invention.

FIG. 21(b) shows a side elevation partial cross-sectional view of a bullet mechanism in accordance with an embodiment of the present invention.

FIG. 21(c) shows a side elevation view of a bullet mechanism in accordance with an embodiment of the present invention.

DETAILED DESCRIPTION OF THE PREFERRED EMBODIMENTS

Figure 3E:
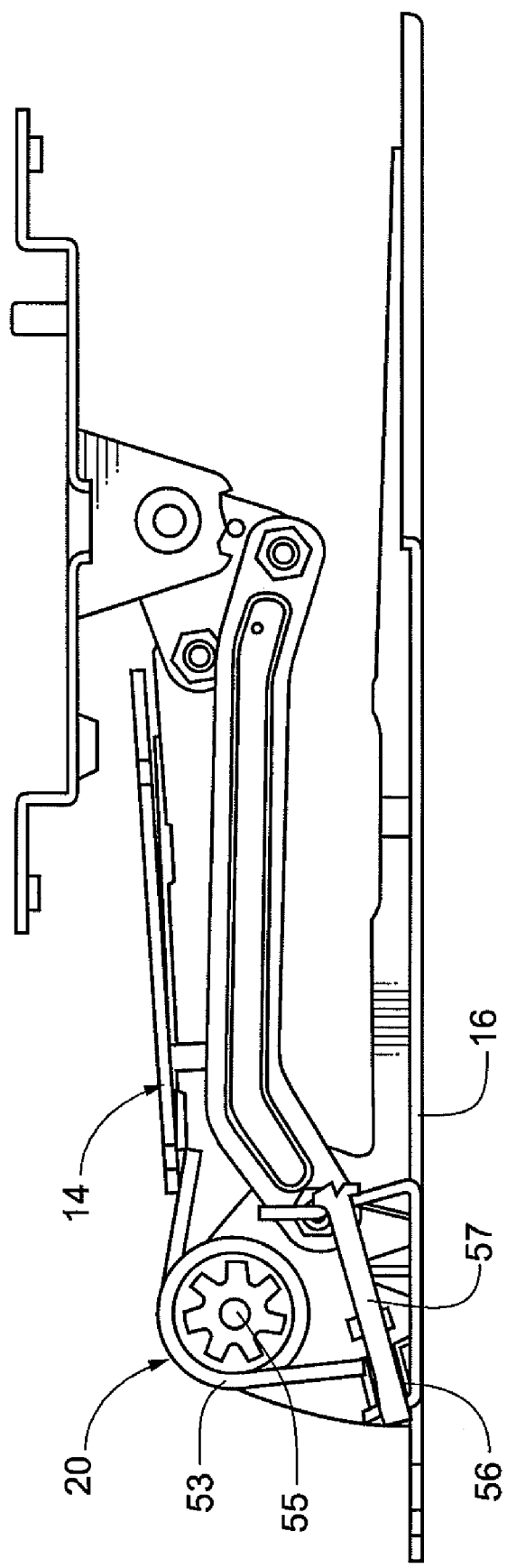
FIG. 3(e) shows a side elevation partial cross-sectional view of a stand in a second position in accordance with an embodiment of the invention.

The following detailed description should be read with reference to the drawings, in which like elements in different drawings are numbered identically. The drawings, which are not necessarily to scale, depict selected embodiments and are not intended to limit the scope of the invention. Examples of constructions, materials, dimensions, and manufacturing processes are provided for selected elements. All other elements employ that which is known to those of skill in the field of the invention. Those skilled in the art will recognize that many of the examples provided have suitable alternatives that can be utilized.

The following disclosure discusses stand systems and methods for supporting an object, such as a notebook or a projector, with a generally planar object surface. Generally, "notebook" refers to a portable personal computer, sometimes referred to as a "laptop." Notebooks in various embodiments can include a processor, a memory system, an input device such as a keyboard or mouse, an output device such as a screen or display, various compartments for receiving removable media, and a port system, among other elements. Generally, "projector" refers to a video projector, including but not limited to projectors using cathode ray tube, LCD, DLP, and LCOS technology. A video projector in various embodiments can include an illumination system, a lens system, an input port, and processing electronics, all configured to receive an electronic signal and project a corresponding image upon a display surface. Various embodiments of the stands discussed herein can support objects, including projectors and notebooks, and have several advantages over prior stands, such as allowing an object to be positioned at any suitable location within a range of travel rather than set into a predefined position. In addition, the various embodiments of the stands discussed herein are easily maneuverable, such as providing for easy adjustment of the object's position with one hand. For example, stands in accordance with embodiments of the invention are moveable using less than a predefined percentage of the object weight. In some embodiments, the stand and object can be maneuvered using a force equal to 10% or less of the weight of the object itself. All of these properties are provided in a stand that is low cost to produce and highly reliable.

FIG. 1(a) shows a schematic representation of a stand 10 in accordance with an embodiment of the invention. The stand 10 includes a tray 12 functionally coupled to a support member 14, which in turn is functionally coupled to a base 16. The base can include any mechanism useful for supporting or connecting the support member to a support surface, such as a horizontal (e.g., desk top) or vertical (e.g., wall) support surface. The tray 12 can include a generally planar tray surface 13, and can support an object 18, such as, for example, a notebook as shown in FIG. 1(a) or a projector as shown in FIG. 1(b). In some embodiments the generally planar tray surface 13 can support an object 18 with a generally planar object surface 15. For example, in one embodiment, the generally planar object surface 15 can be a lower exterior surface of an object such as a notebook or a projector. In the embodiment shown, a movement mechanism 20 functionally couples the support member 14 with the base 16. The movement mechanism 20 is adapted to allow the support arm 14 and the tray 12 to move along a range of travel relative to the base 16. For example, in one embodiment the movement mechanism 20 allows the support arm 14 to pivot with respect to the base 16. As the support arm 14 pivots, it raises and/or lowers the tray 12 with respect to the base 16. With such movement, a user can conveniently move the tray 12 between two or more positions or locations along the range of travel.

According to one embodiment, the movement mechanism 20 is adapted to provide continuous adjustability along the range of travel. As previously discussed, prior stands only include a discrete number of tray positions. The movement mechanism 20 of the present embodiment is adapted to set or position the tray 12 at an infinite number of locations along the range of travel. For example, in one embodiment, the tray 12 can be repositioned to a new location along the range of travel, and tray 12 will be substantially retained at that location against the gravitational force exerted by the tray 12 and the object 18. The internals of the movement mechanism 20 may be any suitable device capable of moving (e.g., raising, lowering, and/or pivoting) the stand in a controlled and reproducible counterbalanced type manner, such as a lift mechanism (sometimes referred to herein as a lift engine) and/or a pivot mechanism. In some embodiments, the movement mechanism counterbalances the weight of the object to allow a user to position the object using a force less than the weight of the object (e.g., less than 10% of the weight of the object). In certain embodiments, the movement mechanism 20 may include a pivot mechanism coupled between the base 16 and the support member 14, and this pivot mechanism may allow the object 18 and the tray 12 to be controllably pivoted between two or more locations along the range of travel. The pivot mechanism can be any suitable mechanism to provide this function, such as the spring or friction pivot described further below.

Referring again to FIG. 1(*a*), the tray 12 can be functionally coupled to the support member 14 with a pivot 22 (e.g., a friction or spring pivot) that allows the tray 12 and the object 18 to be tilted relative to the support member 14. This embodiment can allow the position of the tray 12 and the object 18 to be adjusted without changing the angle of the tray 12 relative to the base 16. In such embodiments, the tray may be moved back and forth or up and down while always having the tray horizontal and parallel with a horizontal support surface such as a floor. Of course, in some embodiments, the pivot 22 can allow the tray 12 and object 18 to be tilted relative to the base 16. In alternate embodiments, the stand 10 can allow the tray 12 to be tilted relative to the base 16 without the use of the pivot 22 as will be described below in more detail.

Referring to FIGS. 2(*a*)-(*d*), various views are shown of a stand 10 similar to the stand 10 of FIGS. 1(*a*) and (*b*) without the tray 12. The stand 10 includes the support member 14 coupled to the base 16 via the movement mechanism 20 as described with respect to FIG. 1(*a*). The pivot 22 can be used to functionally couple a tray, such as the tray 12 of FIG. 1(*a*), to the support member 14. The support member 14 can comprise a bar linkage, such as, for example a four-bar linkage. As used herein, "bar linkage" is used in some embodiments to refer to the support member 14 without intending to limit the support member 14 to embodiments comprising a bar linkage. As shown in FIG. 2(*a*), the support member 14 comprising a four-bar linkage can include four bars, represented schematically as D1, D2, L1, and L2, coupled together at their respective ends. In some embodiments the support member 14 can comprise two or more four-bar linkages. For example, the stand 10 depicted in FIGS. 2(*a*)-2(*d*) comprises a four-bar linkage including bars 24, 25, 28, and 30, and another four-bar linkage including bars 26, 27, 29, and 31.

FIGS. 3(*a*)-(*e*) further show the movement mechanism 20 in greater detail in accordance with one embodiment. The movement mechanism 20 comprises a pivot mechanism including a spring or friction pivot. As can be seen in FIG. 3(*c*), the pivot mechanism includes first and second torsion springs 53 and 54 wound around an axle 55 mounted on the base 16 between frames 28 and 29. Although the following embodiment discusses the use of two springs, it should be appreciated that only one or more than two torsion springs are contemplated. One end of each torsion spring 53, 54 is biased against the four-bar linkage 14, and the opposite end of each torsion spring 53, 54 is mounted within an adjustment block 56. In one embodiment, the torsion springs are wound around the axle 55 tightly enough to exert an expanding force between the base 16 and the four-bar linkage 14, thus providing a counter balancing force against the tray and/or the weight of an object, such as a projector or notebook, placed on the tray. For example, in a stationary position, the springs provide enough force to prevent the tray from lowering on its own. The spring force, however, is not large enough to raise the tray without assistance. A user can overcome the spring force by moving the tray up or down to a new position. Once in the new position, the spring force again keeps the tray stationary. In some embodiments the pivot mechanism may provide a stationary force substantially equal to the weight of an object, for example a notebook or a projector, thus enabling easy movement of the tray. In some embodiments the tension of the spring and the spring force can be adjusted by adjusting an adjustment screw 57 which in turn moves the adjustment block 56.

In some embodiments the stand 10 can allow the tray 12 to be tilted relative to the base 16 without the use of a pivot 22, as previously discussed. Referring to FIGS. 4(*b*) and 4(*c*), the tray 12 previously mentioned can attach directly to extending portions 32 and 33 of coupler bars 30 and 31 respectively without the use of an additional pivot. As the support member 14 is pivoted with respect to the base 16, extending portions 32, 33, and any tray attached thereto, tilt with respect to the base 16. For example, in a first position shown in FIG. 4(*b*), the support member 14 is lifted away from the base 16 and the extending portions 32, 33 (and any attached tray) are tilted forward with respect to the base 16. In a second position shown in FIG. 4(*c*), the support member 14 is lowered towards the base 16 and the extending portions 32, 33 (and any attached tray) are generally parallel with the base 16.

The rate an attached tray tilts along the range of travel with respect to the base 16 can be adjusted by changing the length of one or more of the bars D1, D2, L1, and L2 (as shown in FIGS. 2(*a*) and 4(*b*)). For example, in some embodiments the length of bar D1 is greater than the length of bar D2. This arrangement provides for a greater amount of tilt of the tray as the support structure travels through its range of motion, and is useful for providing an attached tray with a larger range of travel.

Accordingly, various degrees of tilt can be provided along the range of travel. For example, the dimensions of one or more of the bars D1, D2, L1, and L2 can be shortened or lengthened to achieve varying amounts of tilt. Alternatively, embodiments including a pivot such as pivot 22 in FIGS. 3(*a*)-3(*e*), can allow a tray to tilt to varying degrees along the range of travel. In some embodiments, the tray is always tilted less than 90 degrees with respect to a horizontal plane. In another embodiment the tray is always tilted less than 60 degrees with respect to a horizontal plane. In another embodiment the tray is always tilted less than 45 degrees with respect to a horizontal plane. It will be appreciated that the tilt can be limited to many angles and that the above limits are merely exemplary embodiments.

Some embodiments of the invention provide a stand with a locking mechanism. Such a locking mechanism is useful for locking the tray into a desired position. FIGS. 3(*a*)-(*c*) show various views of a stand 10 including a locking mechanism in accordance with an embodiment of the invention. The locking mechanism can allow the position of the stand 10 to be locked and unlocked, as further shown in the embodiments depicted in FIGS. 4(*a*)-(*c*), 5(*a*)-(*c*), and 6(*a*) and 6(*b*). Referring again to FIGS. 3(*a*)-(*c*), the tray 12 for holding an object, such as a notebook or a projector, can be functionally coupled to the pivot 22 (e.g., a friction or spring pivot) and the pivot 22 can be coupled to the movement mechanism 20 (e.g., a pivot mechanism including a spring) via the support member 14. As is shown, the support member 14 comprises a bar linkage. The support member 14 can comprise, for example, two four-bar linkages. One four-bar linkage can include bars 24 and 25 corresponding to schematic bars L2 and L1 respectively. Another four-bar linkage can include bars 26 and 27, likewise corresponding to schematic bars L2 and L1 respectively. As used herein, the L2 bars 24, 26 are also described as input bars 24, 26 and the L1 bars 25, 27 are also described as follower bars 25, 27. The base 16 can comprise bars or frames 28, 29, which correspond to schematic bar D1, for attaching the support member 14. The support member 14 can further comprise bars or coupler bars 30, 31, which correspond to schematic bar D2, attached at the respective ends of bars 24, 25 and 26, 27.

The locking mechanism in this embodiment can include a slider bar 34 that is functionally coupled to the bar linkage 14 at two joints of the bar linkage 14 such that it keeps the bar linkage 14 from collapsing when the slider bar 34 is locked in place. For example, the slider bar 34 can be coupled between a first joint 36 and a second joint 38, which are on opposite ends of bars 24 and 25 on one side of the bar linkage 14. The slider bar 34 can be pivotally connected to the first joint 36 and can be connected to the second joint 38 via a slot 40 and a removable fastener 42 (e.g., a screw knob or levered cam clamp).

As shown in FIG. 3(b), as the height of the stand 10 increases, the relative distance between the first joint 36 and the second joint 38 increases, and the slider bar 34 pivots and slides away from the second joint 38 along the slot 40. As shown in FIG. 3(c), as the height of the stand 10 decreases, the relative distance between the first joint 36 and the second joint 38 decreases, and the slider bar 34 pivots and slides toward the second joint 38 along the slot 40. As shown in FIGS. 3(b) and (c), the slot 40 can have endpoints 44 and 46. At any desired position along the extent of the slot 40 between endpoints 44, 46, the slider bar 34 can be locked in place against the frame 28 with the removable fastener 42, which in this embodiment is a screw knob. This embodiment allows the height of the stand 10 to be locked at an infinite number of positions along the extent of the slot 40 instead of a low number of pre-fixed positions as in previous locking mechanisms.

In use, and referring again to the embodiment depicted in FIGS. 3(b) and 3(c), a user can adjust the stand 10 by first unlocking the locking mechanism. To do so, the user can unfasten fastener 42, which in this case involves turning a screw knob. The user can then adjust the height of the stand 10 freely to a newly desired position. As the user raises the tray 12, the slider bar 34 pivots around first joint 36 and slides along the slot 40 away from the second joint 38 up to a maximum extent defined by the end point 46 of the slot 40. As the user lowers the tray 12, the slider bar 34 pivots around first joint 36 and slides along the slot 40 towards the second joint 38 up to a maximum extent defined by the end point 44 of the slot 40. When the user has adjusted the stand 10 into the desired position, he or she can fasten the fastener 42 to lock the slider bar 34 in place, which in this embodiment involves turning the screw knob to tighten the slider bar 34 against the frame 28. Thus, the position of the stand is locked for normal weight bearing purposes. For example, the locking mechanism may resist movement of the tray from the weight of an object such as a notebook or a projector, or in some embodiments may resist an amount of force greater than the object weight, for example 1-5 lbs force greater.

Figure 4C:
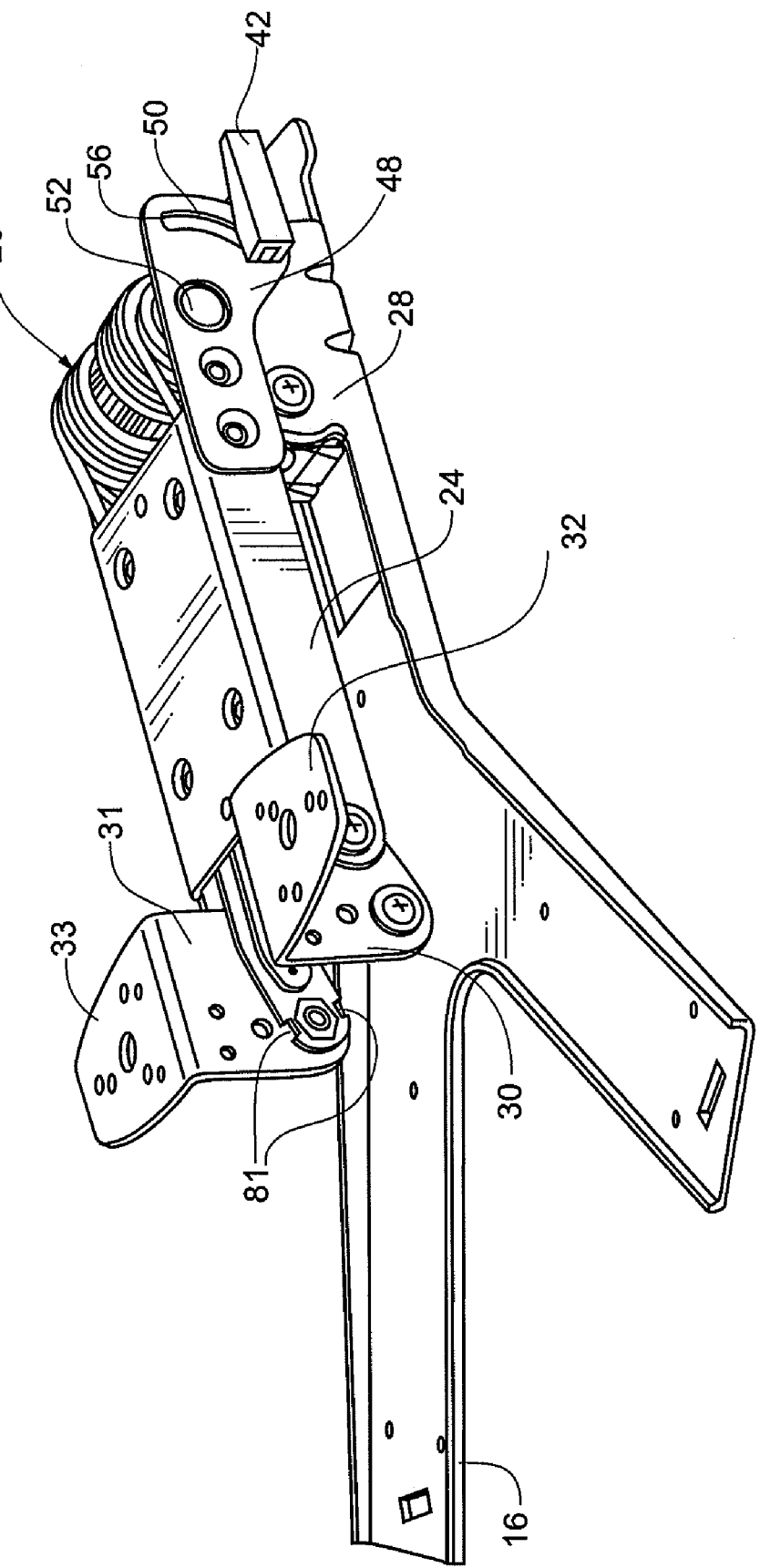
FIG. 4(c) shows a front perspective view of a stand including a locking mechanism with a rotating bracket in a second position in accordance with an embodiment of the invention.

FIGS. 4(a)-(c) show an embodiment of the stand 10 with a locking mechanism including the removable fastener 42 and a rotating bracket 48. The rotating bracket 48 can be attached to the input bar 24 and can include a curved slot 50 through with the removable fastener 42 is coupled with the frame 28. As the height of the stand is increased or decreased, the rotating bracket 48 and the curved slot 50 rotate with the input bar 24 about a third joint 52 of the bar linkage 14. The rotation of the rotating bracket 48 and the curved slot 50 is relative to the frame 28. The removable fastener 42, in this embodiment a levered cam clamp, can act to lock rotation of the rotating bracket relative to the frame 28 at any position along the extent of the curved slot 50 between endpoints 54, 56 of the curved slot 50. This allows the height of the stand 10 to be locked at any desired position along the extent of the curved slot 50 between the endpoints 54, 56.

Referring to the embodiment depicted in FIGS. 4(a)-(c), a user can unlock the stand 10 by unfastening the fastener 42, which here includes pulling the cam clamp lever away from the rotating bracket 48. The user can then freely adjust the stand to a newly desired position. As the user raises or lowers the tray 12, the rotating bracket 48 and the curved slot 50 rotate around the third joint 52 up to a maximum rotation defined by the endpoints 54, 56 of the curved slot 50. When the stand is in the desired position, the user can refasten the fastener 42, i.e., pushing back the cam clamp lever, to lock the rotating bracket 48 against the frame 28. Thus, the height of the stand is locked for normal weight bearing purposes.

Figure 5B:
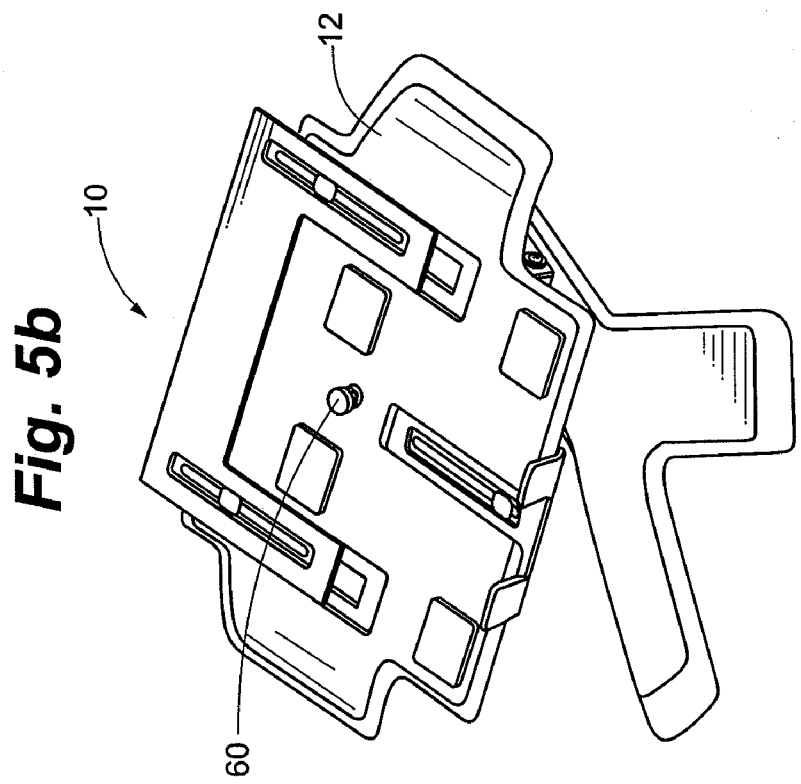
FIG. 5(b) shows a front perspective view of a stand including a locking mechanism with a plunger assembly in accordance with an embodiment of the invention.
Figure 5A:
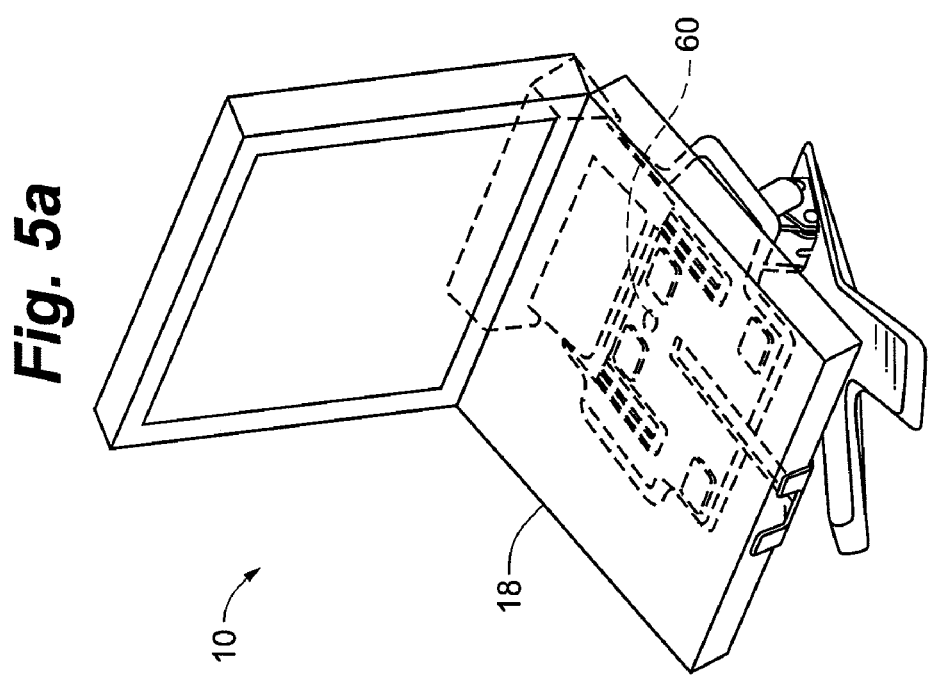
FIG. 5(a) shows a front perspective view of an object and stand including a locking mechanism with a plunger assembly in accordance with an embodiment of the invention.
Figure 6B:
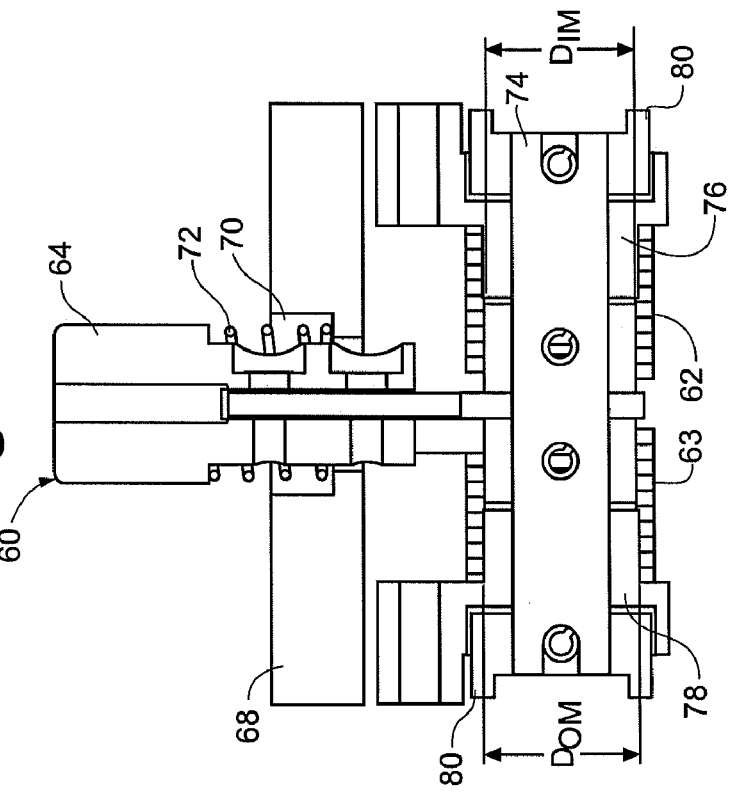
FIG. 6(b) shows a front cross-sectional view of a locking mechanism for the stand shown in FIGS. 5(a)-(c).
Figure 6A:
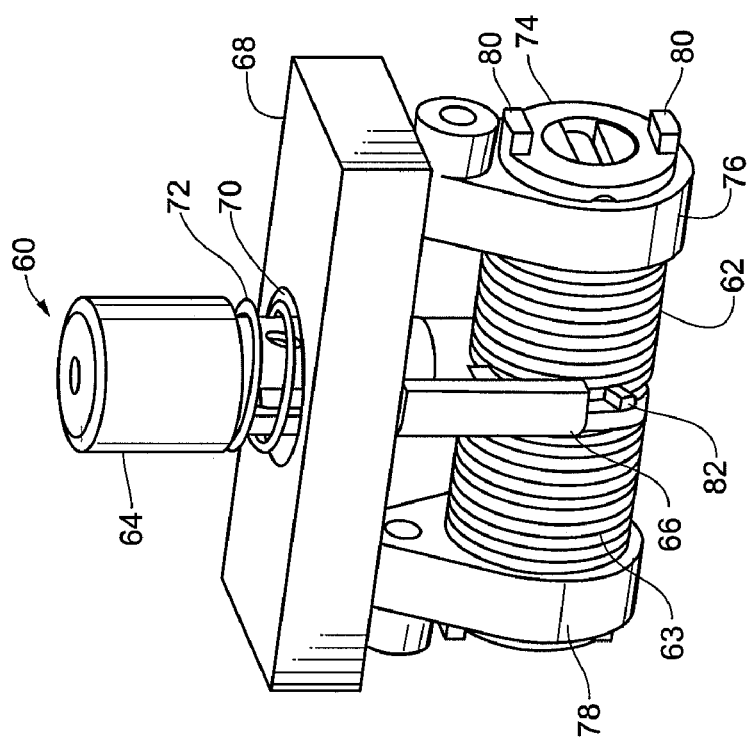
FIG. 6(a) shows a front perspective view of a locking mechanism for the stand shown in FIGS. 5(a)-(c).

FIGS. 5(a)-(c) show an embodiment of a stand 10 with a locking mechanism including a plunger assembly. The plunger assembly can include a plunger 60 and first and second torsion springs 62, 63. Although the following embodiment discusses the use of two springs, it should be appreciated that locking mechanisms with only one or more than two torsion springs are contemplated. FIGS. 6(a) and 6(b) show a detailed view of the plunger 60 and the torsion springs 62, 63. The plunger 60 includes a first end 64 for actuating the plunger and a second end 66, dimensioned to engage the first and second torsion springs 62, 63. A mounting bar 68 can include an aperture 70 for mounting the plunger 60 with respect to the torsion springs 62, 63. Referring to FIG. 5(c), the mounting bar 68 can be mounted with screws or another fastener between the coupler bars 30, 31 of the bar linkage 14. Referring again to FIGS. 6(a) and 6(b), a plunger spring 72 around the plunger biases the plunger in a position away from the mounting bar 68. In some embodiments, the plunger spring 72 can be attached at its ends to one or both of the plunger 60 and the mounting bar 68 using fasteners (e.g., an adhesive or receiving grooves in the plunger or mounting bar). In some embodiments, the plunger spring 72 may not be attached to either the plunger 60 or the mounting bar 68 and may be placed about a portion of the plunger 60 and allowed to rest against a portion of the mounting bar 68.

The first and second torsion springs 62, 63 are mounted around an inner mandrel 74, a first outer mandrel 76, and a second outer mandrel 78, respectively. The outer mandrels 76, 78 can be attached with the mounting bar 68 to the coupler bars 30, 31, as shown in FIG. 5(c), such that the outer mandrels rotate with the coupler bars. The inner mandrel 74 can be attached to the ends of the follower bars 25, 27 such that the inner mandrel rotates with the follower bars. For example, pegs 80 on one or both ends of the inner mandrel 74 can fit into corresponding notches 81 in the ends of the follower bars (notches shown in FIG. 4(c)).

Referring to FIGS. 6(a) and 6(b), a portion of the first torsion spring 62 is attached to the first outer mandrel 76, and a portion of the second torsion spring 63 is attached to the second outer mandrel 78. In some embodiments, the diameter of the outer mandrels, $D_{OM}$, are larger than the inner diameter of the torsion springs 62, 63 in order to lock the torsion springs onto the outer mandrels with frictional resistance. In some embodiments, the diameter of the inner mandrel, $D_{IM}$, is smaller than $D_{OM}$, the diameter of the outer mandrels. For example, in some embodiments $D_{IM}$ can be about 0.1 to 0.5 mm smaller than $D_{OM}$. In another embodiment, the difference in diameter can be about 0.3 mm. In an alternative embodiment, the diameters of the inner mandrel 74 and the outer mandrels 76, 78 can be substantially the same and a torsion spring with multiple sections of varying tension can be used to lock the mandrels.

In a locked position, the inner diameter of the torsion springs is smaller than $D_{IM}$. The frictional resistance between the torsion springs and the inner mandrel 74 prevents the inner mandrel 74 from rotating with respect to the torsion springs and the outer mandrels 76, 78 under normal load bearing conditions. Because the outer mandrels are attached to the coupler bars 30, 31 and the inner mandrel is connected to the follower bars 25, 27, movement of the bar linkage 14 is restricted, and the height position of the stand 10 is locked. In some embodiments, the torsion springs 62, 63 include round and/or square wire. In some embodiments, the torsion springs 62, 63 include only square wire in order to increase the surface area of the torsion springs in contact with the inner mandrel 74 and thus increase the frictional resistance and locking strength.

In an open position of the torsion springs, the inner diameter of the torsion springs 62, 63 is large enough to allow the inner mandrel 74 to rotate with respect to the outer mandrels 76, 78. In this embodiment, the inner diameter of the torsion springs 62, 63 remains small enough so that the torsion springs remain locked on the outer mandrels 76, 78. In some embodiments, the diameter $D_{IM}$ of the inner mandrel 74 can remain slightly larger than the inner diameter of the torsion springs 62, 63 to provide some resistance as the inner mandrel 74 rotates. Although this embodiment provides for the torsion springs 62, 63 to remain locked on the outer mandrels as the inner mandrel 74 rotates, it should be appreciated that other configurations are possible. For example, the torsion springs can be locked on the inner mandrel 74, but remain free with respect to the outer mandrels 76, 78 as the inner mandrel rotates.

In some embodiments, each torsion spring 62, 63 can include a spring leg 82 that allows the second end 66 of the plunger 60 to increase or decrease the inner diameter of the torsion springs. It should be appreciated that the locking mechanism can be biased to be normally locked or normally open. For example, in a normally locked configuration, the torsion springs lock the inner mandrel in their normal state. In FIG. 6(*a*), when the plunger 60 is pushed down, the second end 66 of the plunger engages the spring leg 82 in order to open the first torsion spring 62 (i.e., increase the spring inner diameter). A similar effect occurs with the second torsion spring 63. Varying amounts of engagement can be provided in different embodiments. In one embodiment, the plunger can open torsion springs 62, 63 by pushing down on the spring legs 3.0-5.0 mm. In the open position, the inner mandrel 74 can rotate with respect to the outer mandrels 76, 78. When the plunger returns to its spring-biased state, the torsion springs return to their normally locked state. In an embodiment with a similar but opposite configuration, normally opened torsion springs 62, 63 can allow the inner mandrel 74 to rotate until the plunger 60 is pushed down. The second end 66 of the plunger can then engage the spring legs in order to tighten the torsion springs against the inner mandrel 74, thus locking the inner mandrel with respect to the outer mandrels under normal load bearing conditions.

In some embodiments, like those shown in FIGS. 5(*a*) and 5(*b*), a tray 12 is attached to the stand 10 for supporting the object 18. In these embodiments, the object 18 can act to actuate the plunger 60 in order to lock or unlock the height position of the stand. In some embodiments including the tray 12, the length of the plunger 60 can vary in order to protrude far enough above the tray 12 in order to allow it to be actuated by a user or the object 18. For example, the plunger length can in one embodiment vary up to about 15.0 mm in order to be actuated by objects with different generally planar object surface profiles.

In some embodiments of a normally locked stand of FIGS. 5(*a*)-(*c*) and 6(*a*) and 6(*b*), a user can adjust and lock the stand in the following manner. In some embodiments, the stand 10 with a object 18 mounted thereon is normally locked in that the torsion springs 62, 63 are wound tightly around the inner mandrel 74 so that the inner mandrel 74 can not rotate due to the frictional resistance of the torsion springs 62, 63 against the inner mandrel. In order to adjust the height of the stand 10, the user can remove the object 18, or in some embodiments, manually engage, the plunger 60. When released, the plunger 60 can release the spring legs 82 of the torsion springs 62, 63 in order to increase the diameter of the torsion springs, thus unlocking the stand in that the increased diameter of the torsion springs loosens their grip on the inner mandrel 74 so it can rotate. After the user has adjusted the stand to the desired height, he or she can return the object 18, or otherwise apply pressure to the plunger 60. The plunger 60 then engages the spring legs 82, thus allowing the torsion springs 62, 63 to become tightly wound around the inner mandrel 74. Thus, the height of the stand is again locked for weight bearing purposes. Of course, the stand 10 could be configured to normally be in the locked position, the plunger engaging the torsion spring to place the stand in the unlocked position.

Figure 7:
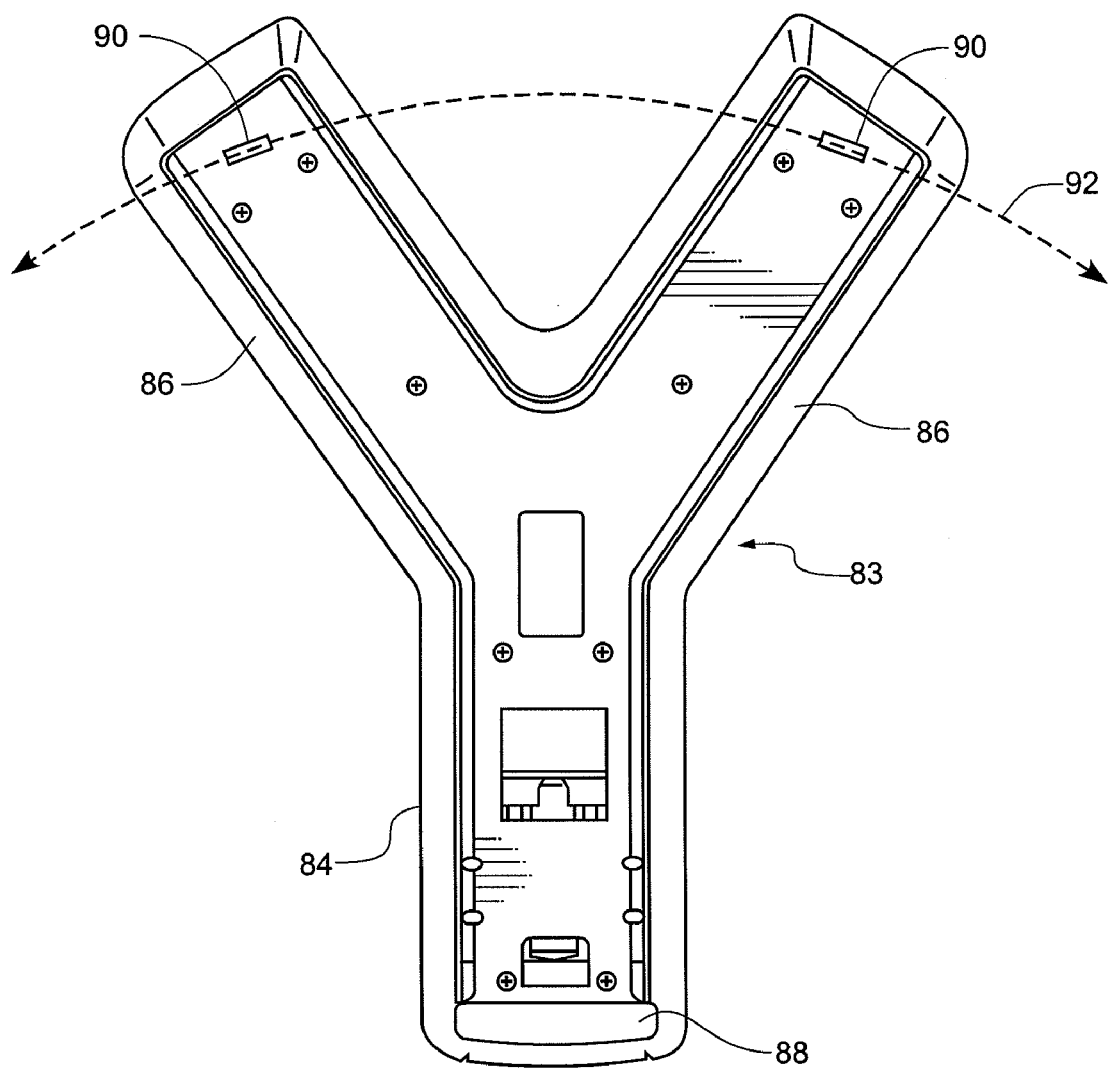
FIG. 7 shows a bottom plan view of a stand base in accordance with an embodiment of the invention.

FIG. 7 is a bottom plan view of a stand base 83 that can be used in embodiments of the invention. As shown in the embodiment, base 83 can have a generally Y-shaped footprint with a back portion comprising back leg 84 and a front portion comprising two front legs 86. As shown in the embodiments of FIGS. 1-6, the stand 10 can position the tray over the front legs 86 in order to more evenly distribute the weight of the object supported by the tray and lessen the risk of tipping. In some embodiments, the base 83 can include a pad 88 placed at the end of the back leg 84. The pad 88 can comprise a polymer, such as polyurethane, which provides some frictional resistance against the support surface upon which the stand is placed. The frictional resistance from the pad 88 can lessen slippage of the base 83. In one embodiment, the base 83 can also include wheels 90 for rotating the base 16. The wheels 90 can be located proximal the ends of the front legs 86. The wheels 90 can also comprise polyurethane in order to provide some traction upon the support surface. When the base 83 is placed on the support surface, a user can rotate the base generally along dashed line 92. The pad 88 acts as a pivot point, slipping enough to rotate slightly, but not enough to substantially change position. As shown, the wheels may have an axis generally parallel to the longitudinal axis of the pad (e.g., within about 10 degrees or less).

Figure 8:
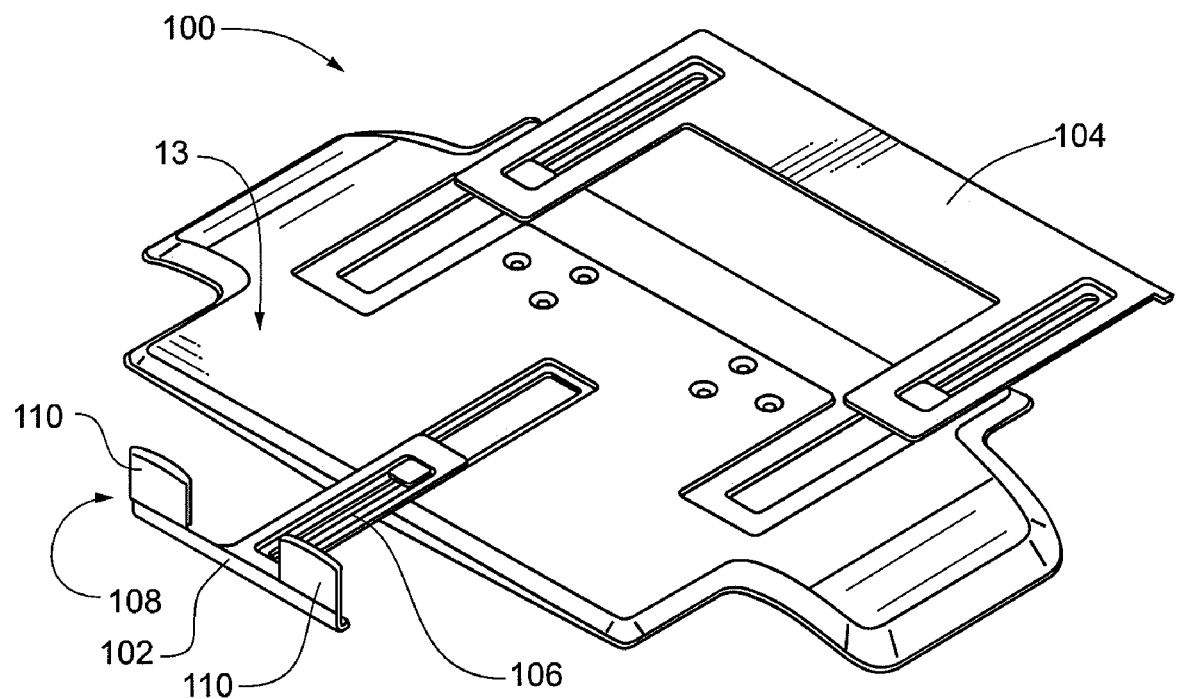
FIG. 8 shows a perspective view of a tray in accordance with an embodiment of the invention.

FIG. 8 is a perspective view of a tray 100 according to some embodiments of the invention. Tray 100 can include a generally planar tray surface 13 for supporting an object. The tray 100 can optionally include a retention slide 102 and/or an extension slide 104. The retention slide 102 generally includes a sliding portion 106 and a retaining portion 108, which in this embodiment includes feet 110. The retaining portion 108 can act to retain an object upon the tray 100 by preventing the front edge of the object from sliding forward off the tray 100. Sliding portion 106 provides the retention slide 102 with an adjustable length to accommodate objects of different sizes. Similarly, the extension slide 104 can slide out in order to extend the size of the tray 100 to support both larger and smaller objects.

Figure 9:
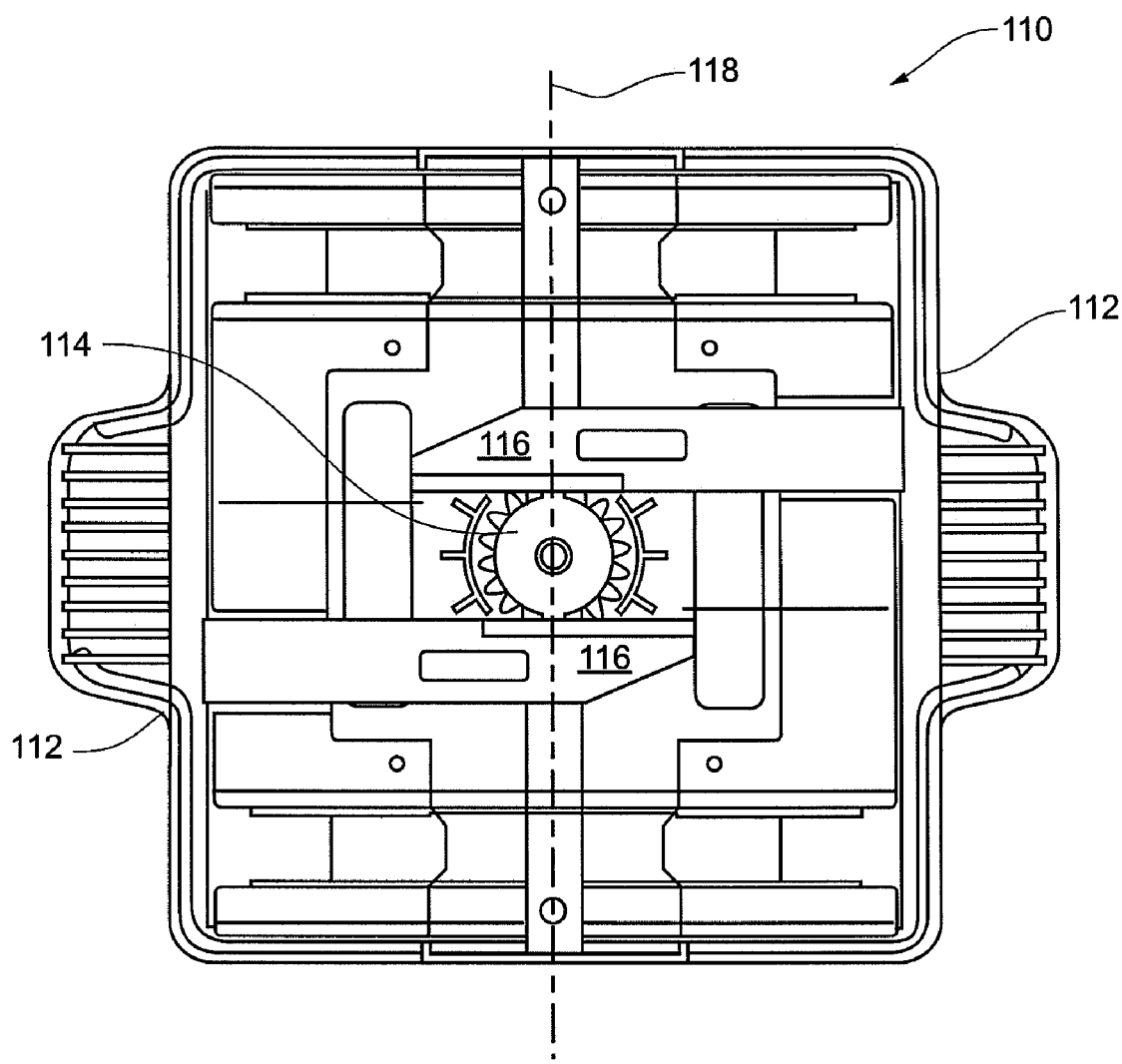
FIG. 9 shows a bottom plan view of a tray in accordance with an embodiment of the invention.

FIG. 9 is a bottom plan view of a tray 110. The tray 110 includes side extensions 112 that can be adjusted in order to increase the overall size of the tray 110. In one embodiment, a user can extend one or both side extensions 112 in order to, for example, support larger objects such as larger notebooks and/or projectors. In the embodiment depicted in FIG. 8, the tray 110 includes a gear 114. The gear 114 engages extension arms 116 of each side extension 112. As one side extension is extended, the extension arm of that side extension engages the gear 114. The gear 114 at the same time engages the opposite extension arm, forcing the opposite side extension to also extend. According to one embodiment, the gear 114 acts so that both side extensions 112 are equally extended, thus ensuring that the tray 110 is balanced about a centerline 118. Of course, the side extensions 112 and the various extensions shown in FIG. 8 can all be provided on a single tray.

Figure 10B:
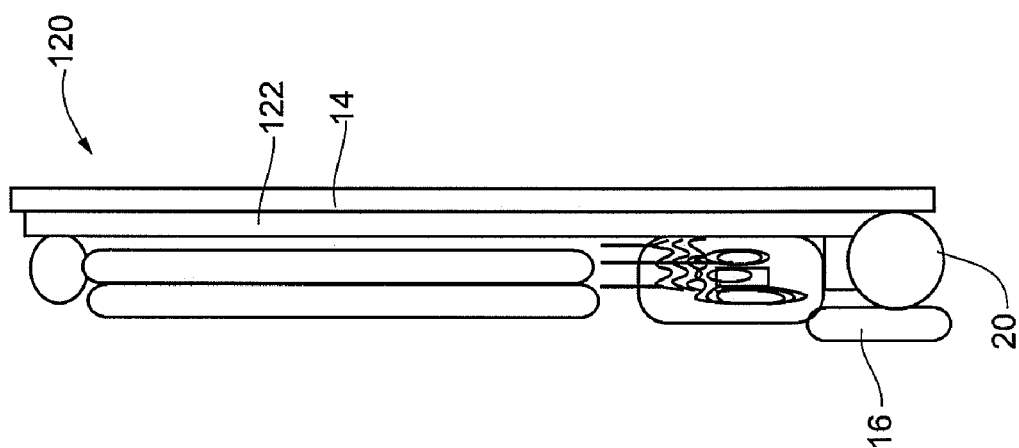
FIG. 10(b) shows a side elevation view of a stand including a folding tray in a second position in accordance with an embodiment of the invention.
Figure 10A:
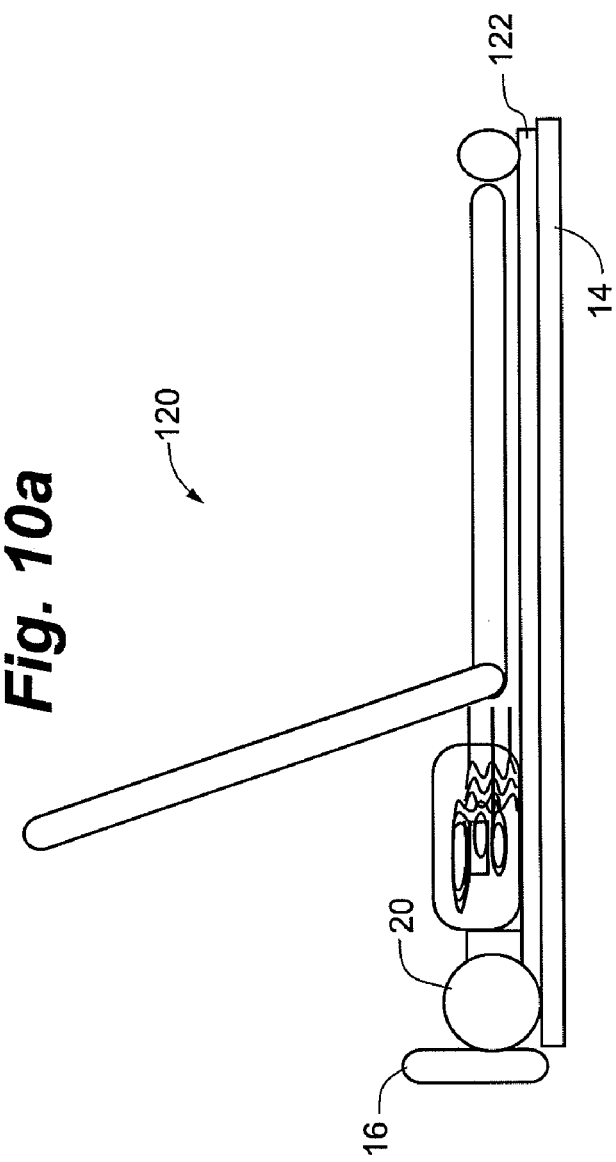
FIG. 10(a) shows a side elevation view of a stand including a folding tray in a first position in accordance with an embodiment of the invention.

With reference to FIGS. 10(*a*) and 10(*b*), some embodiments of the invention include a stand 120 with a folding tray 122. The stand 120 may be provided with a base 16 which may be attached to a vertical support surface (e.g., a wall) or a horizontal support surface such as a desk. The stand 120 can also include a support member 14 which may also be supported by a horizontal support surface such as a desk. The stand 120 may have at least two positions. In one position the tray 122 is folded down and the object 18 is available for use by a user, as shown in FIG. 10(*a*). In a second position the object 18 and tray 122 have moved to a vertical position as shown in FIG. 10(*b*). For example, the vertical position can be substantially parallel with a vertical support surface (e.g., wall). In another embodiment, the tray 122 may only be moved to a position less than 90 degrees with respect to a horizontal support surface. Embodiments such as this are useful for supporting a notebook and for providing an open work space that is easily convertible into a computer work station by moving the notebook between the first and second positions.

The tray 122 may be moved between the first and second positions by any suitable manner, such as with the movement mechanism 20 previously discussed. For example, movement mechanism 20 can comprise a pivot mechanism included proximate an edge of the tray 122 supporting the object 18 and this pivot may allow the object 18 and the tray 122 to be controllably pivoted between the first and second positions. The pivot mechanism can be any suitable mechanism to provide this function, such as a spring or friction pivot or a pivot comprising a rotary cam device, including the pivot mechanisms described above, and any number of pivots may be provided. With reference to FIGS. 11(*a*) and 11(*b*), some embodiments include two pivot mechanisms.

With further reference to FIGS. 11(*a*) and 11(*b*), accessories may also be moved between the first and second positions. For example, a mouse tray 124 may be provided to move along with the object 18. In addition, a cord holder 126 may be provided. In some embodiments an entire computing system including the mouse, cords, and any accessory may be moved simultaneously between the first and second positions.

In some embodiments the object 18 and the tray 122 pivot between a first position and second position and slide toward and away from a user. Referring to FIGS. 11(*a*) and 11(*b*), in some embodiments, a guiding arm 128 is provided to link the tray 122 and a support structure, such as a wall or a desk. It should be noted that the guiding arm 128 in these embodiments does not have to support the weight of the object 18 but simply guides it along the tracks provided. The guiding arm 128 may comprise a two bar link arm system. The first bar 130 has a first end that is attached to the support surface and a second end that is attached to a pivot 132. The second bar 134 has a first end attached to the pivot 132 and a second end attached to a pivot 136 that is also attached to the tray 122 and/or support member 14. In such embodiments the tray 122 may be moved in a horizontal plane parallel with a floor. In a first horizontal position the tray may be moved outward to extend the guiding arm 128, as shown in FIG. 11(*a*). In a second horizontal position, the tray 122 may be moved inward to collapse the guiding arm 128, as shown in FIG. 11(*b*).

Referring to FIGS. 11(*c*) and 11(*d*), in some embodiments one or more parallel tracks 138 may be provided beneath the support member and/or tray 122 to enable sliding movement, as shown in a first horizontal position in FIG. 11(*c*) and a second horizontal position in FIG. 11(*d*). In such embodiments a user can pivot the tray 122 to clear work space but may also position the tray 122 fore and aft. Tracks 138 can be provided with and without a guiding arm. These guiding features allow the tray 122 to be engaged with the pivots to enable movement between the first and second positions. Without such an arm or tracks a user could miss the pivot location when attempting to engage the tray.

Figure 12A:
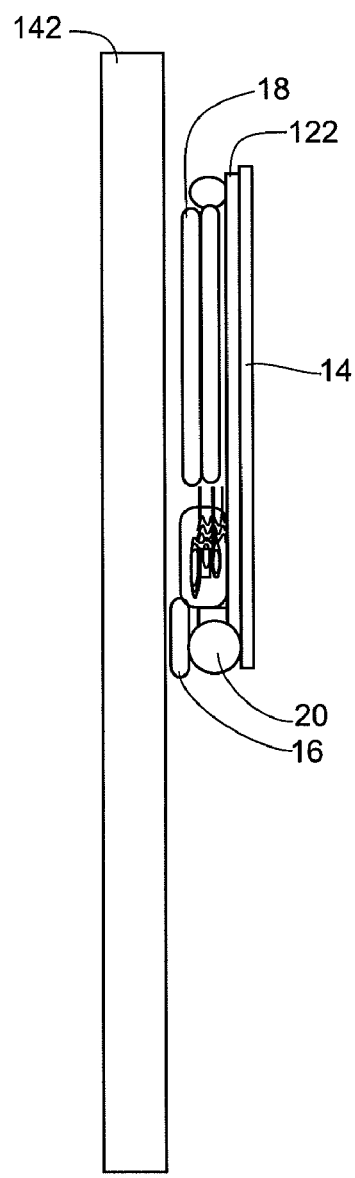
FIG. 12(a) shows a side elevation view of a stand including a folding tray and link in a first position in accordance with an embodiment of the invention.
Figure 12B:
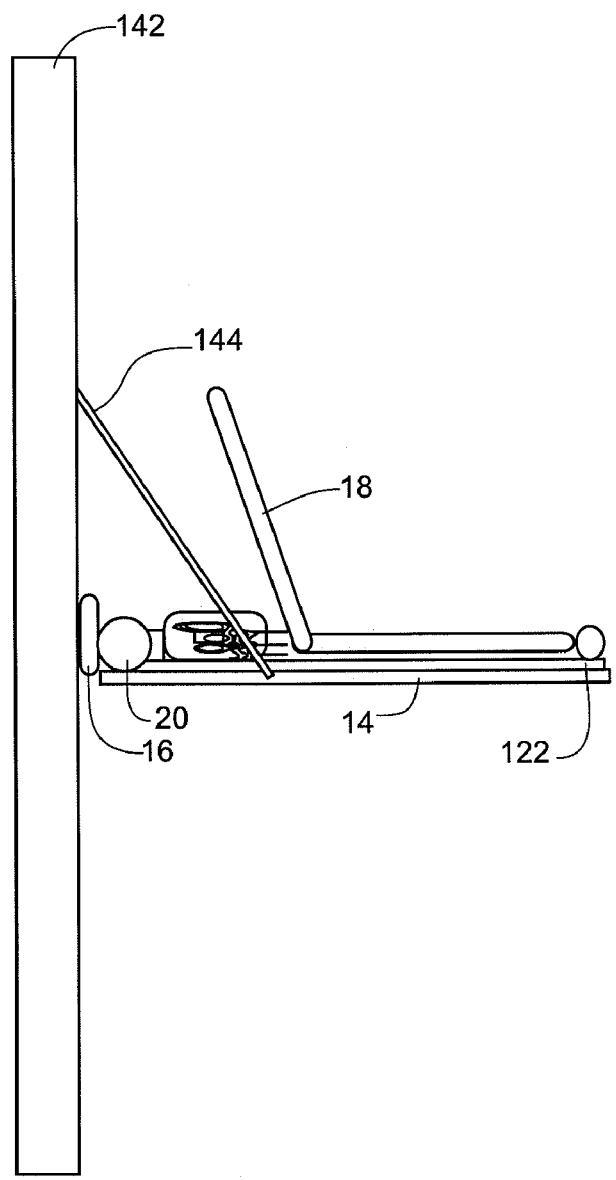
FIG. 12(b) shows a side elevation view of a stand including a folding tray and link in a second position in accordance with an embodiment of the invention.

FIGS. 12(*a*) and 12(*b*) are side elevation views of a stand 140 including a folding tray 122 in accordance with an embodiment of the invention. As is shown, in some embodiments, the stand 140 can be mounted to a vertical support 142, such as a wall. The stand 140 is similar to the embodiments of FIGS. 11(*a*)-(*d*) except base 16 attaches to and is supported by the vertical support 142. When the tray 122 is moved into the upright position, additional space is created within the room. Embodiments such as this may be desirable in locations such as the hallways of hospitals where computers must be used and space is an issue.

The stand 140 can include a link 144 attached to the support member 14 and the vertical support 142. This link 144 allows the support member 14 to be set horizontally and hold weight without disengaging from the vertical support 142. The movement mechanism 20 itself can be the same pivot mechanism as discussed above with the link 144 only serving as a safety apparatus to avoid disengagement.

In some embodiments the stand 140 is provided with an automatic close option. In such embodiments the tray 122 will move between the first and second positions based on some initiating event. In some embodiments supporting a notebook, the initiating event is a time delay from the last time the notebook was engaged. For example, after five minutes of no use the support member 14 may automatically fold into the vertical support surface 142, e.g., a wall. In another embodiment, a user could manually engage the automatic close such by applying a slight upward force onto the bottom surface of the support member 14. The automatic close option would then continue the closure until the support member 14 was engaged with the wall. Such embodiments may be accomplished using a movement mechanism, such as a lift mechanism. For example, a lift mechanism including a cam surface and a spring attached to the vertical support surface 142 and adapted to pull the link 144 inward/upward to raise and close the tray. The cam surface and spring would interact to have a relatively high initiation force and a relatively high closure force but in between the forces would be substantially balanced enabling the base to close against the wall. Such a cam surface is described in Applicant's U.S. Pat. No. 6,994,306, the contents of which are hereby incorporated by reference. In another embodiment, a rotary cam is used to pull the link to close the tray when activated.

Referring to FIGS. 13(a)-(c), stands 148 including a support member such as a support arm 150 are shown in accordance with some embodiments of the invention. Such a support arm 150 can include a counter forced cam spring lift engine for smooth lift and tilt of the type described in Applicant's U.S. Patent Publication No. 2004/0245419, the contents of which are hereby incorporated by reference. The support arm 150 can allow for ergonomic height, tilt and rotation adjustments and when supporting a notebook, enables the notebook screen to be used as a second monitor.

In some embodiments the support arm 150 is attached to a base 151 and includes a tray 14 adapted to securely hold an object 18. The design of the tray 14 can comprise any design suitable to hold a wide range of objects of different sizes. For example, side rods 152 may be provided and thumb screws 154 may be used to tighten and set up the side rods 152 in an appropriate configuration to secure a notebook. In such embodiments, the side rods 152 can be adjusted in a push/pull fashion and secured with the thumb screw 154. In some embodiments the tray 14 can accommodate a small docking station 156 or port replicator for use with a notebook as shown in FIG. 13(c). The tray 14 can be positioned so as to provide a space for an external keyboard 157 for use in embodiments with a notebook.

Further, in some embodiments the support arm 150 includes integrated cable management. For example, cables 158 may be routed through the support arm 150 as best shown in FIG. 13(b). In such embodiments the cables 158 from the object 18, docking station 156, or screen are routed underneath or through the support arm 150 to the base 151 where they are connected to the various assemblies. Such embodiments allow a user to adjust the position of the object 18 and/or screen without having to separately maneuver cables.

In some embodiments, stands 148 can include one base 151 with two arms 150, as shown in FIGS. 13(b) and 13(c). Such stands 148 are useful for having a supported object 18, such as a notebook, on one arm and an additional object 160, e.g., an external monitor, on a second arm. In such embodiments, the base 151 may be provided with a collar 162 to support the second arm. This embodiment allows a user to utilize an object 18 with the additional object 160, each being independently adjustable.

Although FIG. 13(c) describes an exemplary stand 148 with one or more support arms 150 and a docking station 156 or port replicator for use with a notebook, it will be appreciated that such a docking station can be provided in any embodied stand, such as, for example, the stand 10 described with reference to FIGS. 1(a)-5(c). In addition to, or in place of a docking station, some embodiments of the invention include an inductive charger as shown in FIG. 13(d). FIG. 13(d) shows the stand 10 with tray 12, base 16, and an inductive charger 165 adapted to inductively charge a notebook supported on the tray 12. For example, in one embodiment the inductive charger 165 includes a transmitting induction coil which transmits electromagnetic energy to a corresponding receiving induction coil within a notebook to power the notebook for use and/or charge a notebook battery.

FIGS. 14(a) and 14(b) show a schematic representation of a stand 170 with a deformable base 172 allowing adjustment of the height of the object 18. In this embodiment, the object 18 is supported by the base 172 which has a generally curved surface. The base 172 can be constructed of a flexible material and a movement mechanism 174 such as a spring, a spring/cam torsion spring or other device causes the base 172 to distort to lift or lower the object 18. In some embodiments a spring is provided to distort the base 172 into an upward type curvature surface. The object 18 creates a counterbalancing force downward. Friction between the base 172 and a horizontal support surface such as a desk may also be used to hold the height position.

With reference to FIGS. 15(a)-(d), several additional stands 180 with height adjustability are depicted according to some embodiments of the invention. Stands 180 may include a free standing base 16 suitable to sit on a horizontal support surface such as a desk. There are several embodiments of stands 180 shown in FIGS. 15(a)-(d), and the various embodiments contain the features of a low cost stand, an ergonomic height adjustability, an easy adjustability to fit various objects such as projectors and/or notebooks, and can accommodate a small docking station or port replicator and/or have space to store a keyboard 157 when supporting a notebook. Further, these embodiments are capable of one hand adjustment.

Figure 15A:
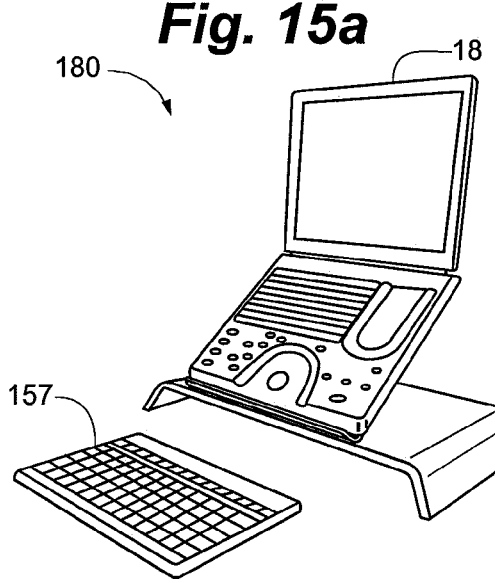
FIG. 15(a) shows a front perspective view of a stand in accordance with an embodiment of the invention.
Figure 15B:
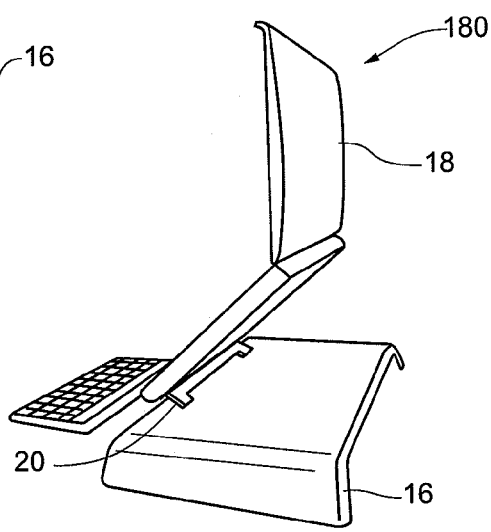
FIG. 15(b) shows a rear perspective view of a stand in accordance with an embodiment of the invention.

In the embodiment shown in FIGS. 15(a) and 15(b), the stand 180 allows the object 18 to pivot to adjust its position. In this embodiment, the movement mechanism 20, such as a pivot mechanism, is provided proximate the front of base 16. A pivot mechanism could be any suitable mechanism, such as spring, friction, or rotary cam device. The pivot mechanism allows the screen of the object 18 to get close to the user, if desired. In some embodiments, a keyboard 157 may be stored beneath the base 16.

Figure 15C:
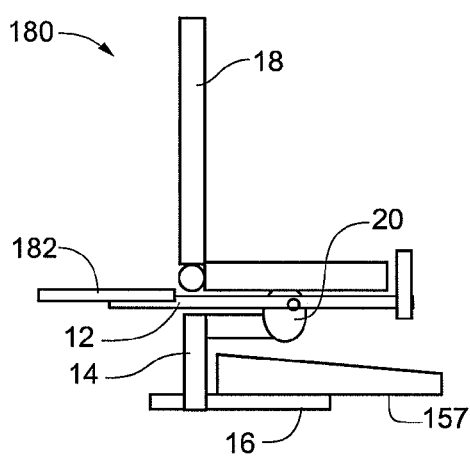
FIG. 15(c) shows a side elevation view of a stand and external keyboard in a first position in accordance with an embodiment of the invention.
Figure 15D:
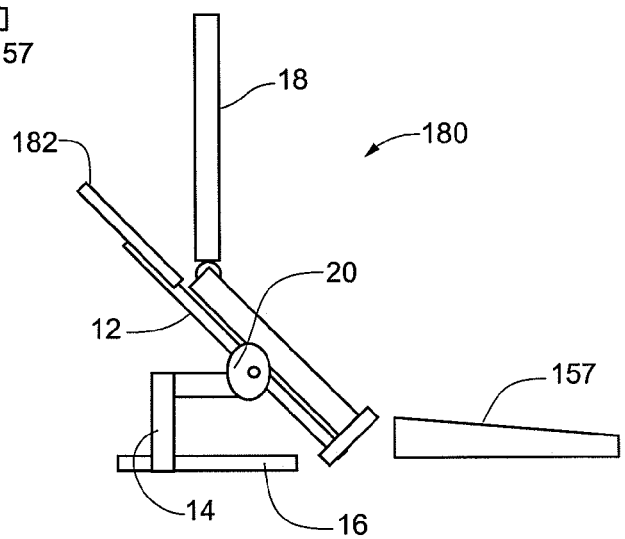
FIG. 15(d) shows a side elevation view of a stand and external keyboard in a second position in accordance with an embodiment of the invention.

In some embodiments, a movement mechanism 20, such as a pivot mechanism is included proximate the middle of a tray 12 supported by a support member 14 and the base 16, as shown in FIGS. 15(c) and 15(d). In this embodiment a stand 180 is provided with a tray 12 to support the object and the tray 12 can pivot or tilt about a pivot mechanism 20 proximate the middle of the tray 12. In embodiments supporting a notebook, the tray 12 can be pivoted or tilted forward and backward which moves the notebook screen up and down and toward and away from a viewer. In some embodiments, there is an extension 182 provided on the stand 180 that could be used to hold a docking station. The pivot mechanism 20 itself may work by either friction, spring, or rotary cam device. In some embodiments keyboard 157 may be stored underneath the stand to clear desk space when the stand is in a substantially horizontal position, as shown in FIG. 15(c). Also in these embodiments when the tray 12 is tilted back, a solid platform is created which enables the computer to be easily snapped into a docking station when a docking station is also supported by the tray 12.

Figure 16A:
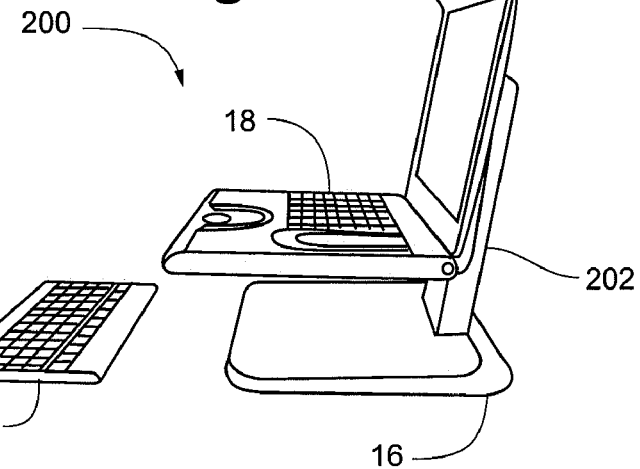
FIG. 16(a) shows a side perspective view of a stand including a movement mechanism comprising a lift engine in accordance with an embodiment of the invention.
Figure 16B:
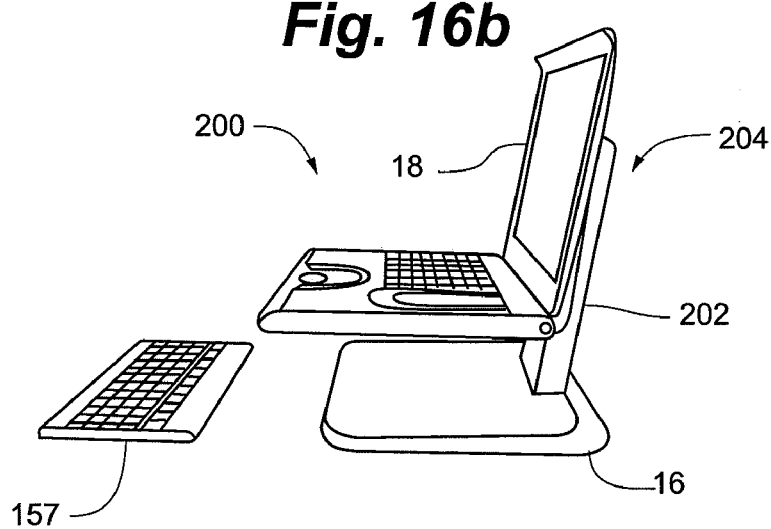
FIG. 16(b) shows a side perspective view of a stand including a movement mechanism comprising a lift engine in accordance with an embodiment of the invention.
Figure 16C:
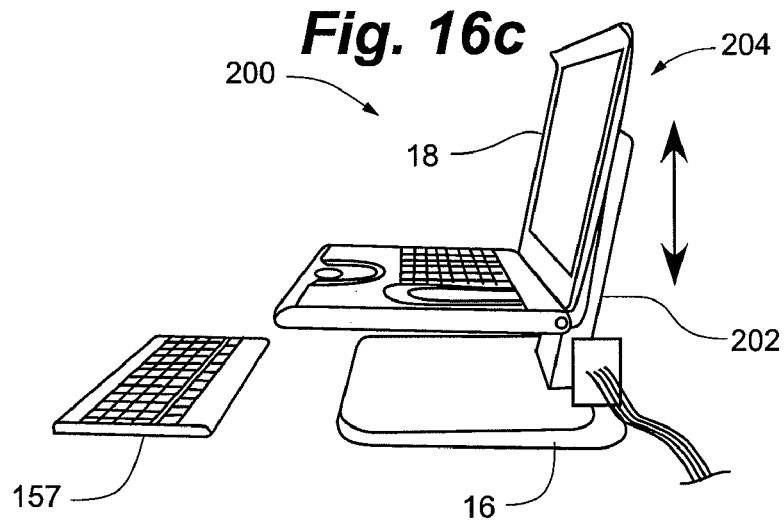
FIG. 16(c) shows a side perspective view of a stand including a movement mechanism comprising a lift engine in accordance with an embodiment of the invention.

FIGS. 16(a)-(c) show perspective views of a stand 200 including a movement mechanism comprising a lift engine. The stand 200 includes a base 16 and a support member 202 such as a column. The base or the column can include a movement mechanism, such as a lift engine/mechanism as described further below. The object 18 is supported by the support member 202, such as on a tray, and can be moved vertically to adjust its position. When the object 18 is in a relatively higher position the keyboard 157 could be stored beneath the object 18 and above the base 16.

FIGS. 16(b) and 16(c) show perspective views of the stand 200 including a height adjustable docking station in accordance with one embodiment of the invention. The height adjustable docking station may include a docking station 204 and/or port replicator adapted to mate with a object 18. In some embodiments, a universal docking station may be provided by including a port replicator with a USB universal docking connection. In such embodiments the object 18 would be placed on the stand 200 and the user would only have to connect one USB port. An inductive charger can also be provided.

In some embodiments of the invention, a user's notebook docking station electronics can be built into a low cost, smooth height adjustable stand for optimal ergonomics. In some embodiments, this docking station 204 allows a user to open and use a notebook screen while a notebook is docked. These embodiments allow external flat panel screen users to also utilize the notebook screen. Further, in some embodiments, the docking station 204 enables the user to stow an external keyboard 157 underneath the object 18 to clear desk space.

Referring to FIGS. 17(a) and 17(b), in some embodiments the stand 200 includes a height adjustable wall mount 206. The mount 206 can be attached to a vertical support and allow the object position to be vertically adjusted. In such embodiments a wall mount 206 with any suitable number (e.g., two) of movement mechanisms (e.g., lift engines) is provided. A first movement mechanism 208 can be proximate the left side and a second movement mechanism 210 can be proximate the right side. The mount 206 itself contains a support member 14 that engages both the right and left side movement mechanisms. The support member 14 can be adapted to hold an object 18, such as a notebook computer by itself or a notebook computer with an extra keyboard 157 on an optional keyboard tray 212, as shown in FIG. 17(a). In some embodiments each of the right and left side movement mechanisms may hold 15 lbs. for a total of 30 lbs. and each movement mechanism can be mounted to the wall with a connector bracket. Each movement mechanism can include a lift mechanism, such as, for example, a rotary cam system as described further below.

Figure 18:
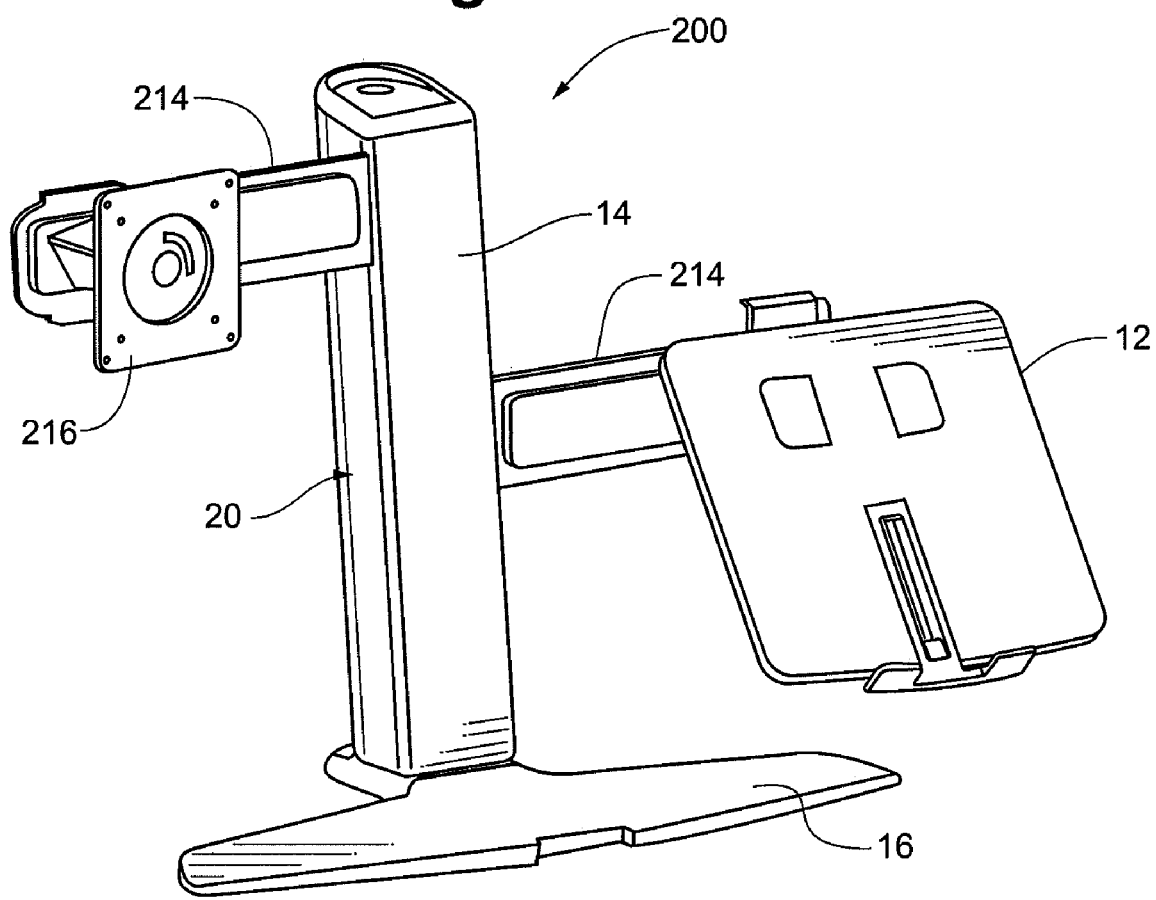
FIG. 18 shows a perspective view of a stand in accordance with an embodiment of the invention.

FIG. 18 is a perspective view of a stand 200 including a movement mechanism 20 comprising a lift engine according to another embodiment of the invention. The stand 200 can include a base 16, a support member 14, and a tray 12 for supporting an object such as a notebook or a projector. The tray 12 can be coupled to a cross support 214 which is further coupled to the support element 14 by way of movement mechanism 20 within the support element 14. The tray 12 can include a retention slide 102 as previously described with reference to FIG. 8. In some embodiments, the stand 200 can include a second cross support 214 for attaching an output device such as an external or second monitor. For example, a connector 216, such as, for example a VESA standard connector, can be coupled to the second cross support 214 for mounting a monitor to the stand 200.

Figure 19:
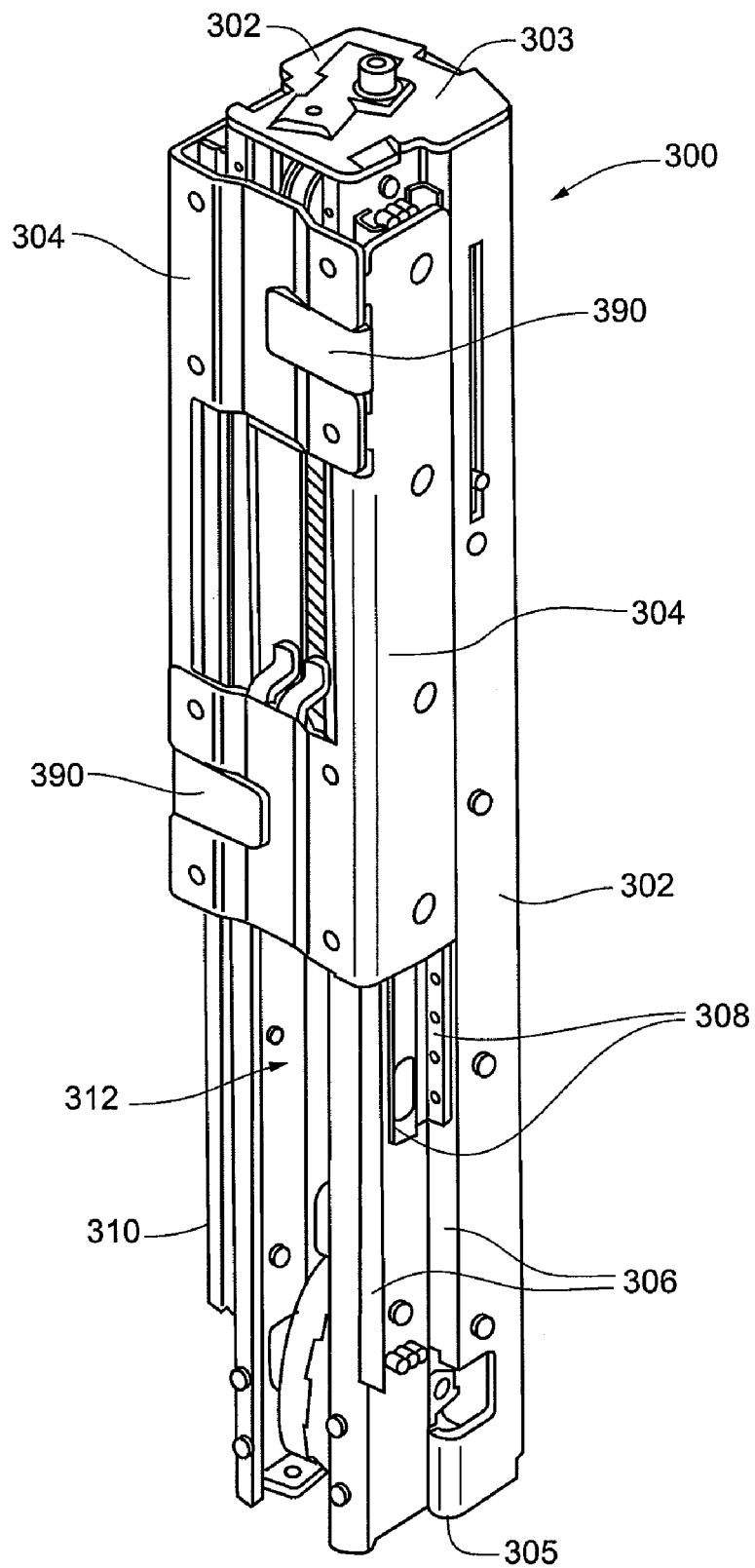
FIG. 19 shows a perspective view of a lift mechanism useful as a movement mechanism in accordance with an embodiment of the present invention.

FIG. 19 is a perspective view of a lift mechanism 300 including a rotary cam that can be useful in embodiments of the invention using a movement mechanism as described above. The lift mechanism 300 generally includes a lift frame 302 with a first end 303 and a second end 305 that is disposed in sliding engagement with a truck 304 upon which various components such as a tray can be attached. The lift frame can be coupled to any of the embodiments of bases described herein. In the embodiment depicted, the lift frame 302 can include a first outer slide 306 and a second outer slide 308 that engage a first inner slide attached to the truck 304 as will be described more fully below. The lift frame 302 can also include a third outer slide 310 and a fourth outer slide that engage a second inner slide attached to the truck 304. The lift frame 302 may generally be enclosed on three sides defining a cavity 312 and may have an opening on the top and/or bottom. As shown in FIG. 19, balancing mechanism components, such as wheels, cams, cables, and energy storage members may be disposed within the cavity 312 in some embodiments.

Figure 20A:
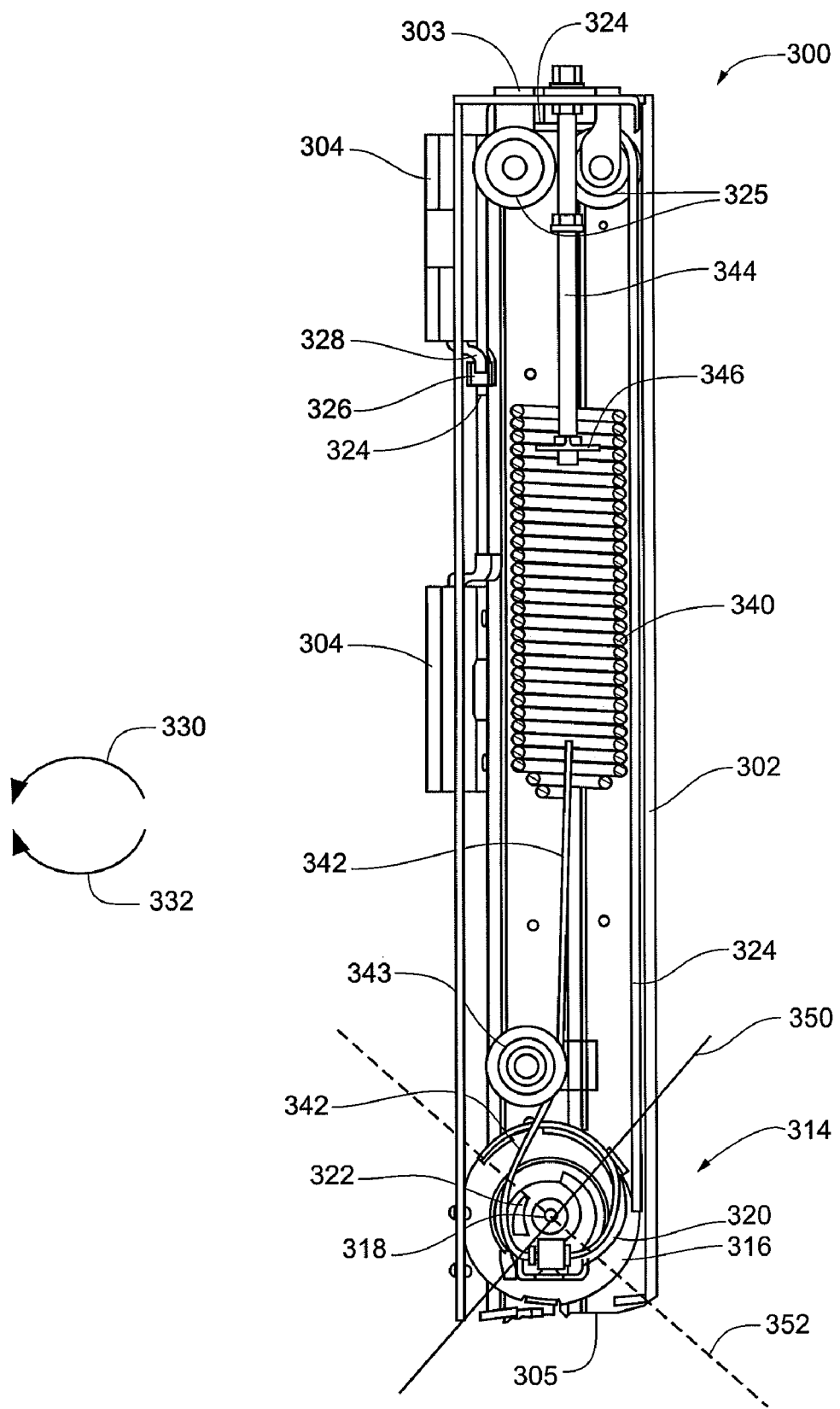
FIG. 20(a) shows a side elevation partial cross-sectional view of the lift mechanism of FIG. 19.
Figure 20B:
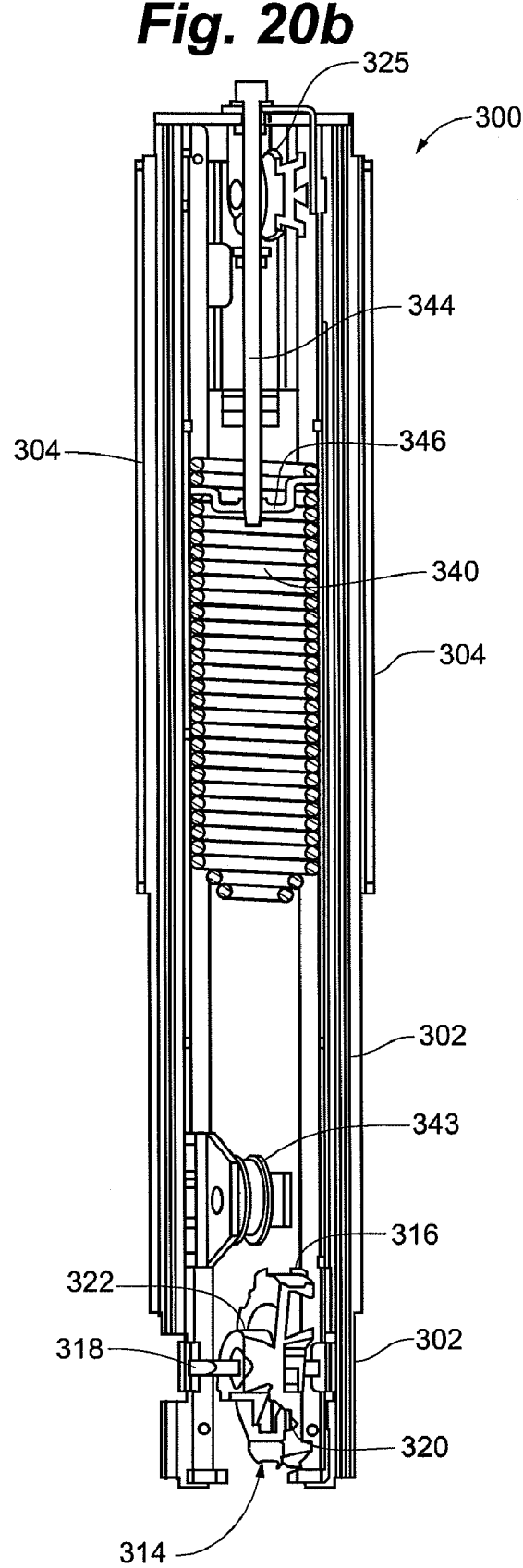
FIG. 20(b) shows a front elevation partial cross-sectional view of the lift mechanism of FIG. 19.

FIGS. 20(a)-(d) show various partial cross-sections of the lift mechanism 300 of FIG. 19. With reference to FIG. 20(a), a side elevation partial cross-section of lift mechanism 300 is shown according to some embodiments. Lift mechanism 300 can include a balance mechanism 314 in order to provide a balancing force between the truck 304 and the lift frame 302. Referring to both FIGS. 20(a) and 20(b), a wheel 316 of balance mechanism 314 is rotationally supported by the lift frame 302 with wheel 316 being free to rotate about a rotational axis 318. In the embodiment of FIGS. 20(a) and 20(b), wheel 316 comprises a pulley member 320 and a cam member 322. Pulley member 320 of wheel 316 can be coupled to the truck 304 by a first cable 324 which is redirected by pulleys 325. For example, the end of first cable 324 can include a stop 326 which catches on upper hooks 328 formed on or attached to the truck 304.

In the embodiment of FIG. 20(a), wheel 316 may be urged to rotate in a counter-clockwise direction 330 by moving the truck 304 toward the second end 305 of the lift frame 302. In some embodiments, however, wheel 316 can be biased to rotate in a clockwise direction 332 by an energy source. This bias provides a balancing force between the lift frame 302 and the truck 304. With further reference to FIG. 20(a), cam member 322 of wheel 316 can be coupled to an energy source comprising a spring 340 by a second cable 342 in the embodiment shown. A follower pulley 343 can direct the second cable 342 so that the spring 340 is pulled substantially longitudinally rather than at an angle.

In the embodiment shown, the output of the energy source (e.g., spring 340) may vary as a function of a deflection of the spring 340. Lift mechanism 300 also includes an adjustment mechanism 344 that may be used to vary the output of the energy source. For example, with reference to FIGS. 20(a) and 20(b), it will be appreciated that the spring 340 extends from a spring plate 346 which is coupled to the first end 303 of the lift frame 302 by the adjustment mechanism 344, which here comprises an adjustment screw. The position of the spring plate 346 relative to end 303, and thus the output of energy from the spring 340, can be adjusted by rotating adjustment screw 344.

In some embodiments, a torque applied to wheel 316 by the truck 304 via first cable 324 is substantially constant while a force applied to wheel 316 by the spring 340 via second cable 342 varies. In some useful embodiments, the cam member 322 is shaped and positioned so that the varying force from the spring 340 is translated to a constant force counterbalancing the force exerted by first cable 324. For example, the effective radius of cam member 322 can vary as a function of the angular orientation of wheel 316. With reference to FIG. 20(a), it will be appreciated that wheel 316 can have a first angular orientation as shown by a first reference line 350, in which cam member 322 has a first effective radius. Wheel 316 can then be rotated, for example by movement of the truck 304 and first cable 324, to a second angular orientation shown by a second reference line 352. In the second angular orientation, the cam member 322 can have a second effective radius. In some embodiments the effective radius of cam member 322 may likewise vary as a function of the displacement of spring 340, for example, as spring 340 urges wheel 316 to rotate from the second angular orientation to the first angular orientation.

Figure 20C:
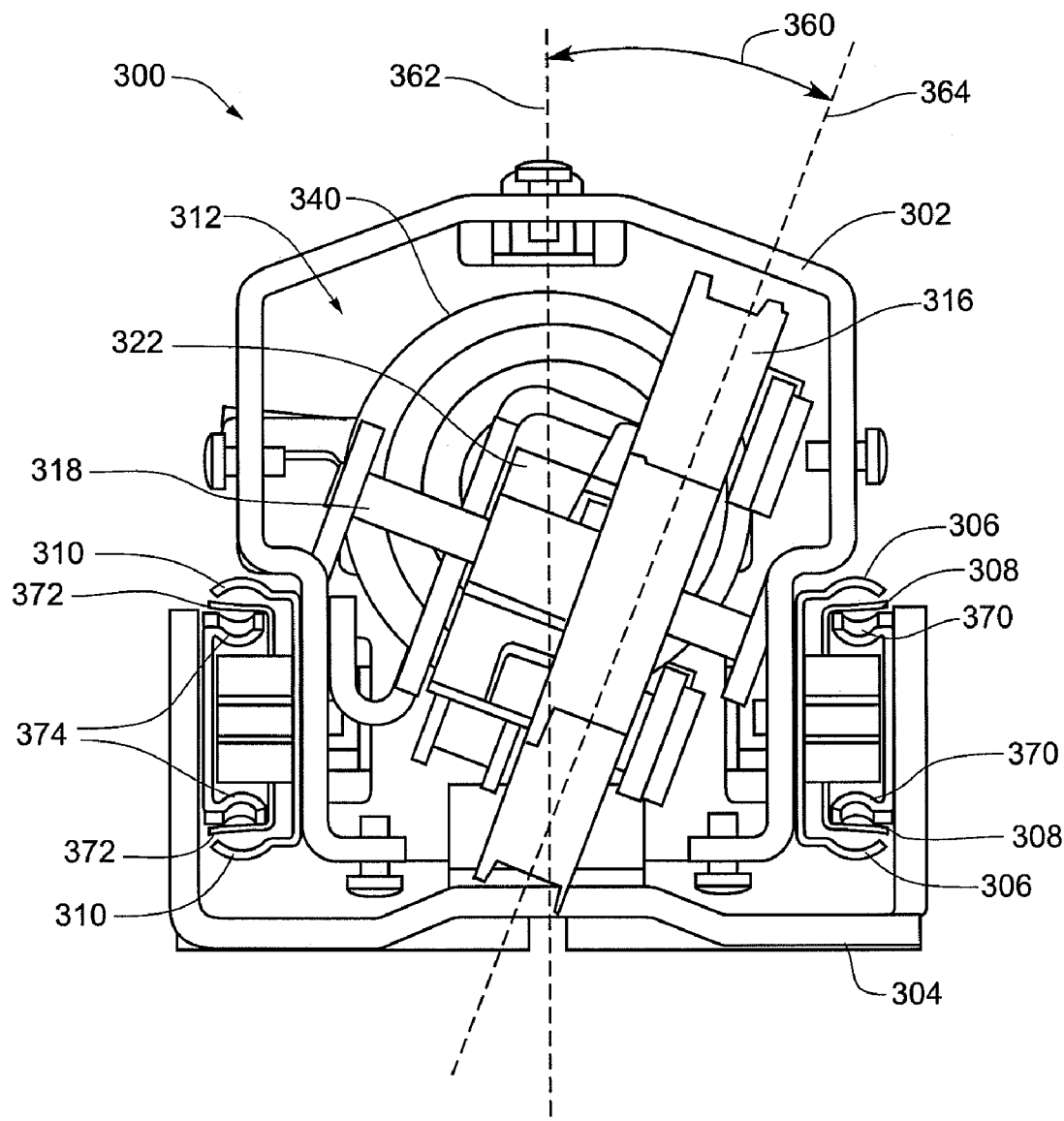
FIG. 20(c) shows a bottom plan partial cross-sectional view of the lift mechanism of FIG. 19.
Figure 20D:
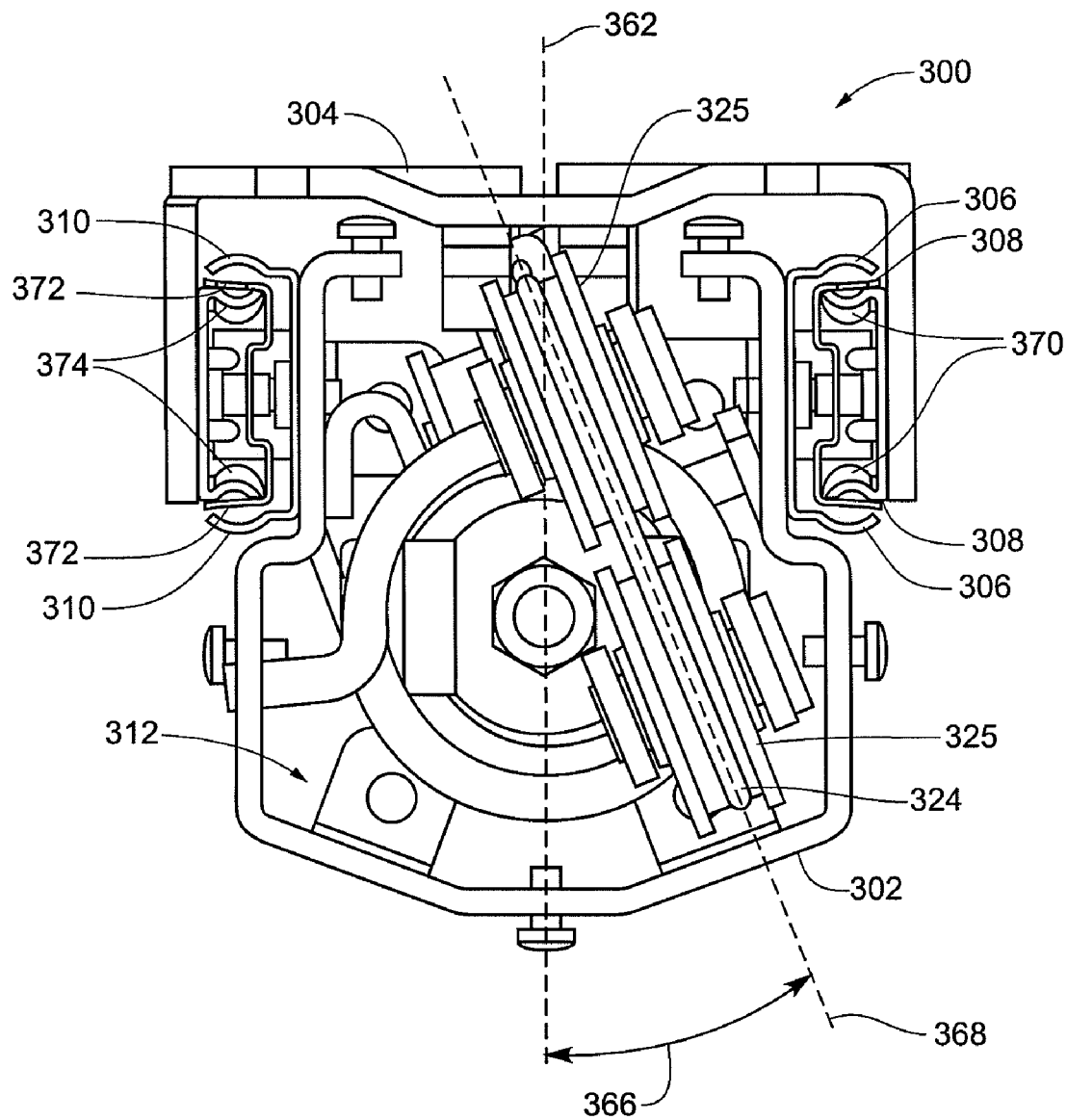
FIG. 20(d) shows a top plan partial cross-sectional view of the lift mechanism of FIG. 19.

FIGS. 20(c) and 20(d) show a bottom plan view and top plan view, respectively, incorporating partial cross-sections of the lift mechanism 300. As will be appreciated, the lift frame 302 and the truck 304 may be produced by any suitable method. In some embodiments, they may be extruded out of materials such as, e.g., aluminum. Such extruded aluminum may provide a lower cost alternative to folded sheet metal, while providing higher reliability over a longer life. In some embodiments, the orientation of one or more elements of the lift mechanism can be altered in order to minimize the size of the cavity 312 in order to minimize the amount of material, and thus cost, of the lift frame 302 and slide 304. For example, with reference to FIG. 20(c), wheel 316 can be mounted about a rotational axis 318 at an angle 360 defined between a midline 362 of the lift frame 302 and a longitudinal axis 364 of the wheel. Similarly, with reference to FIG. 20(d), pulleys 325 can be mounted at an angle 366 defined between the midline 362 and a longitudinal axis 368 of the pulleys 325. In some embodiments the angles 360 and 366 may be the same.

FIGS. 20(c) and 20(d) additionally illustrate the first outer slide 306 and a second outer slide 308 on lift frame 302 that engage the first inner slide 370 attached to the truck 304. The third outer slide 310 and the fourth outer slide 372 can engage the second inner slide 374 attached to the truck 304. In some embodiments, rollers, for example nylon rollers, can couple the respective outside and inside slides to facilitate the sliding engagement between the lift frame 302 and the truck 304.

Some embodiments of the balance mechanism 314 include a more reliable and lower cost method of coupling a cable to an energy storage member (e.g., a spring). For example, as shown in FIGS. 21(a)-21(c), a "bullet" type mechanism 380 may be used to couple second cable 342 to the spring 340 in some embodiments. The bullet type mechanism 380 may include three sections: a larger cylindrical section 382, a smaller cylindrical section 384, and an intermediate conical section 386. The second cable 342 may be received within the smaller cylindrical section 384 and may be prevented from withdrawing from the smaller cylindrical section 384 by a stop 388.

The bullet type mechanism 380 may be configured to translate within the spring 340 along a longitudinal axis of both the bullet type mechanism 380 and the spring 340. The inner diameter of the body of the spring 340 may be slightly larger than the outer diameter of the larger cylindrical section 382 of the bullet type mechanism 380. The inner diameter of the bottom of the spring 340 may be smaller than the outer diameter of the larger cylindrical section 382 of the bullet type mechanism and the bullet mechanism may be configured to contact the inner surface of the spring. In such embodiments, when a tensile force T is applied to the second cable 342, the intermediate conical section 386 of the bullet type mechanism 380 contacts the bottom of the spring 340, thereby applying the tensile force T to the spring 340.

Figure 22:
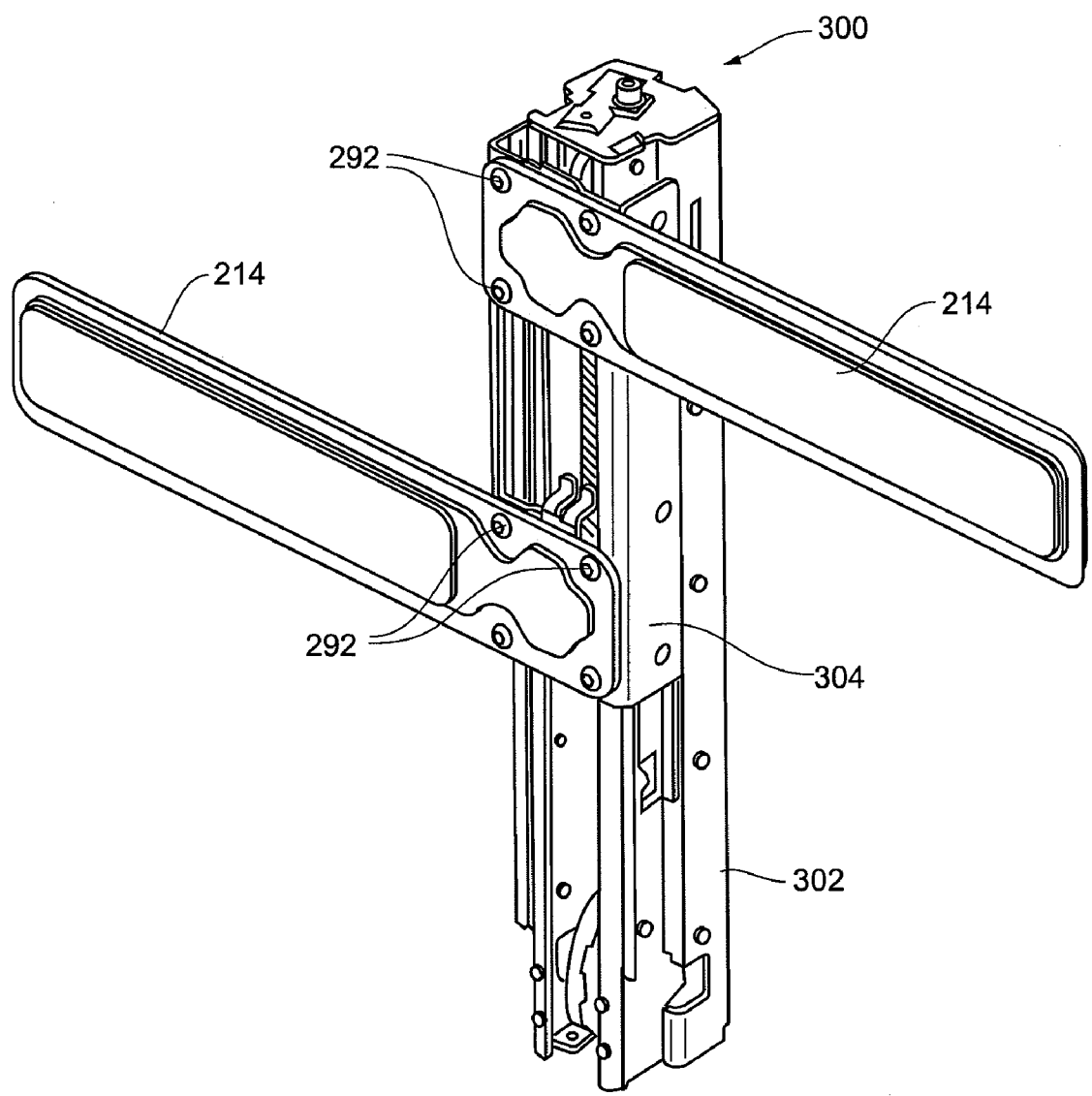
FIG. 22 shows a front perspective view of a lift mechanism including cross supports in accordance with an embodiment of the present invention.

FIG. 22 shows a lift mechanism 300 including the cross supports 214 as shown in FIG. 18, in accordance with an embodiment of the present invention. The cross supports 214 can be mounted on the truck 304 via mounting surfaces 390 as shown in FIG. 19 by any suitable method. For example, screws 392 can be used to mount the cross supports 214. Those skilled in the art will appreciate that the truck 304 can include more or less than the two mounting surfaces 390 shown in FIGS. 19 and 22, and a corresponding number of more or less cross supports 214. Once mounted, the cross supports 214 can be configured for attaching a tray 12 or monitor connector 116 as shown in FIG. 18.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. A stand for supporting an object, comprising:
   a base;
   a support member coupled to the base, the support member useful for supporting the object; and
   a movement mechanism adapted to allow the object to move along a range of travel relative to the base, wherein the base comprises a planar surface for resting on a support surface, the planar surface having a first portion and a second portion, the first portion including a pad for providing frictional resistance between the base and the support surface on which the base is placed, and the second portion including at least first and second wheels oriented for rotating the base about the pad, the pad defining a substantially fixed center of rotation, such that the object is rotated about the substantially fixed center of rotation when the base is rotated about the substantially fixed center of rotation, wherein the at least first and second wheels have respective first and second axes of rotation, the at least first and second wheels trace an arc about the pad, and the at least first and second wheels are adapted to rotate about the respective first and second axes of rotation when the base is rotated about the substantially fixed center of rotation, the first and second axes of rotation being perpendicular to the arc and intersecting the pad.

2. The stand of claim 1, wherein the first portion is a back portion and the second portion is a front portion.

3. The stand of claim 2, wherein the back portion comprises a back leg and the front portion comprises first and second front legs.

4. The stand of claim 3, wherein the pad is proximate an end of the back leg.

5. The stand of claim 1, wherein the pad comprises a polymer.

6. The stand of claim 5, wherein the pad comprises polyurethane.

7. The stand of claim 3, wherein the first wheel is proximal an end of the first front leg and the second wheel is proximal an end of the second front leg.

8. The stand of claim 1, further comprising a tray coupled to the support member, the tray having a generally planar tray surface for supporting an object on the tray.

9. The stand of claim 8, wherein the movement mechanism is adapted to position the tray at an infinite number of locations along the range of travel.

10. The stand of claim 8, further comprising a docking station supported by the tray, for docking a notebook placed on the tray.

11. The stand of claim 8, wherein the movement mechanism comprises a lift mechanism for providing the tray with height adjustability along the range of travel.

12. The stand of claim 1, further comprising a connector associated with the support member for coupling an output device with the stand.

13. The stand of claim 12, wherein the lift mechanism further allows the connector to move along the range of travel.

14. The stand of claim 8, further comprising a notebook supported by the tray.

15. The stand of claim 8, further comprising a projector supported by the tray.

16. A stand for supporting an object, comprising:
   a base;
   a support member coupled to the base, the support member useful for supporting the object; and
   a movement mechanism adapted to allow the object to move along a range of travel relative to the base, wherein the base comprises a planar surface for resting on a support surface, the planar surface having a back portion having a back leg and a front portion having two front legs, the back leg including a polymeric pad for providing frictional resistance between the base and the support surface on which the base is placed, and each of the front legs including a wheel oriented for rotating the base about the pad, the pad defining a substantially fixed center of rotation, such that the object is rotated about the substantially fixed center of rotation when the base is rotated about the substantially fixed center of rotation, wherein the at least first and second wheels have respective first and second axes of rotation, the at least first and second wheels trace an arc about the pad, and the at least first and second wheels are adapted to rotate about the respective first and second axes of rotation when the base is rotated about the substantially fixed center of rotation, the first and second axes of rotation being perpendicular to the arc and intersecting the pad.

17. The stand of claim 16, further comprising a tray coupled to the support member, the tray having a generally planar tray surface for supporting an object on the tray.

18. The stand of claim 17, wherein the movement mechanism is adapted to position the tray at an infinite number of locations along the range of travel.

19. The stand of claim 16, further comprising a connector associated with the support member for coupling an output device with the stand.

* * * * *